March 11, 1941.   H. C. ROBINSON ET AL   2,234,684
STOCK QUOTATION SYSTEM
Original Filed June 18, 1930   20 Sheets-Sheet 1

INVENTORS
Harold C. Robinson
Martin L. Nelson
BY Davis, Lindsey, Smith & Shonts
ATTORNEYS

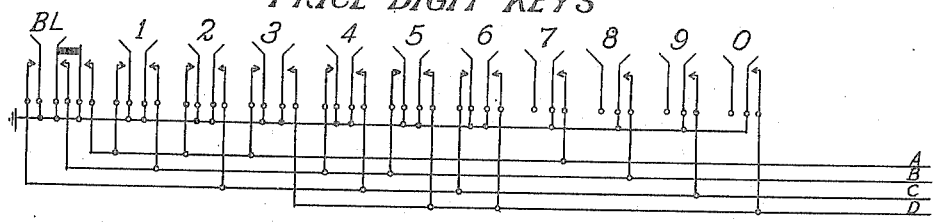
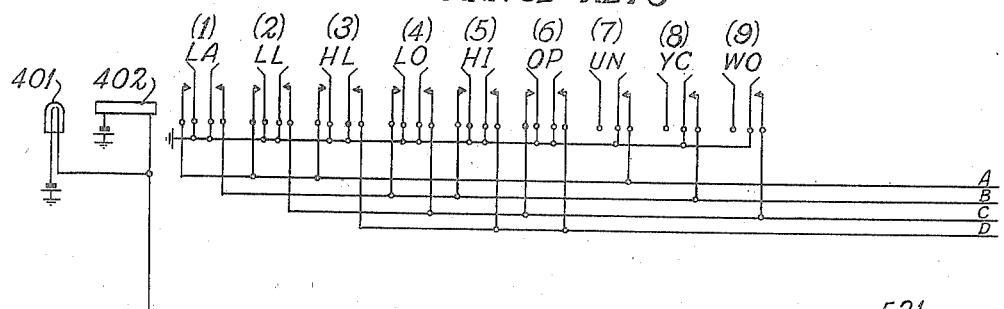
Fig. 4

March 11, 1941.　　H. C. ROBINSON ET AL　　2,234,684
STOCK QUOTATION SYSTEM
Original Filed June 18, 1930　　20 Sheets-Sheet 16
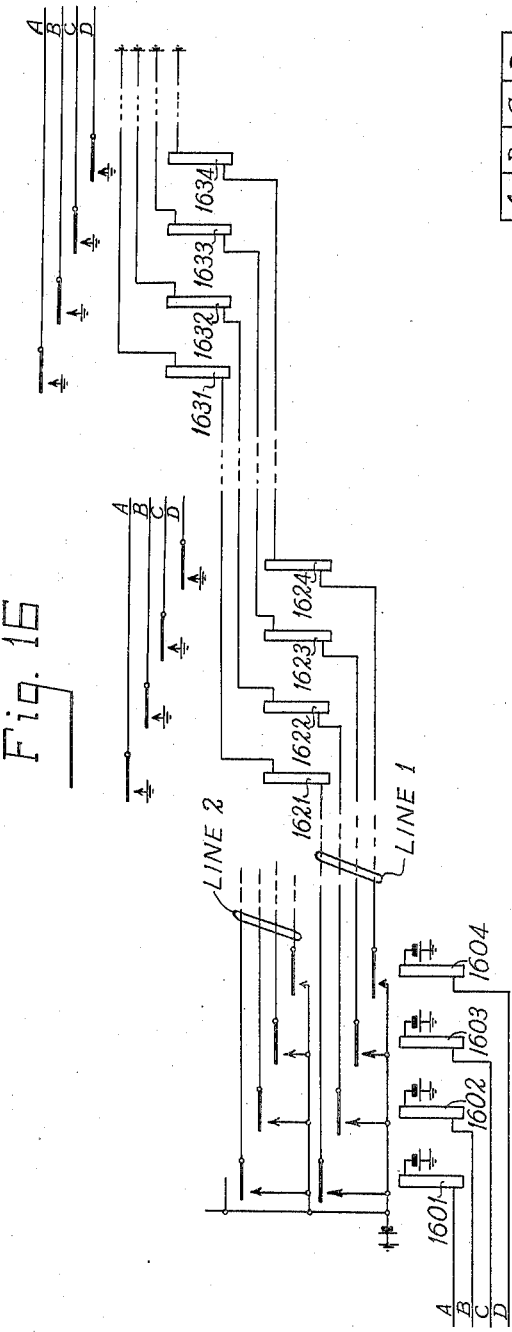
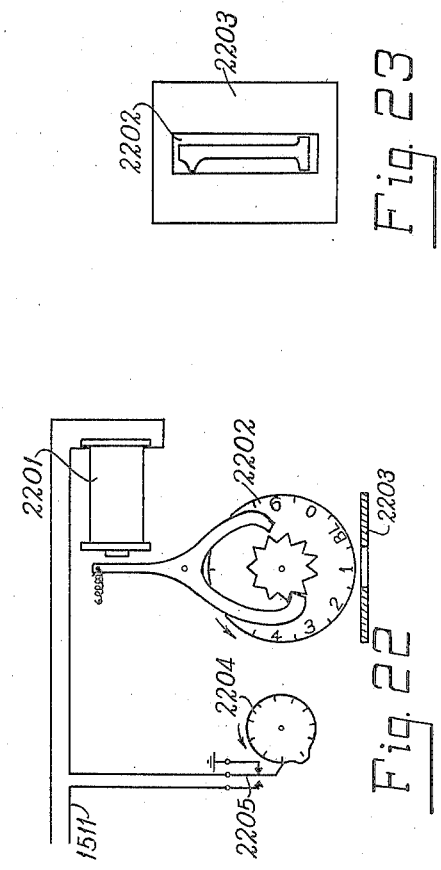
INVENTORS
Harold C. Robinson
Martin L. Nelson
BY Davis, Lindsey, Smith & Shonts
ATTORNEYS

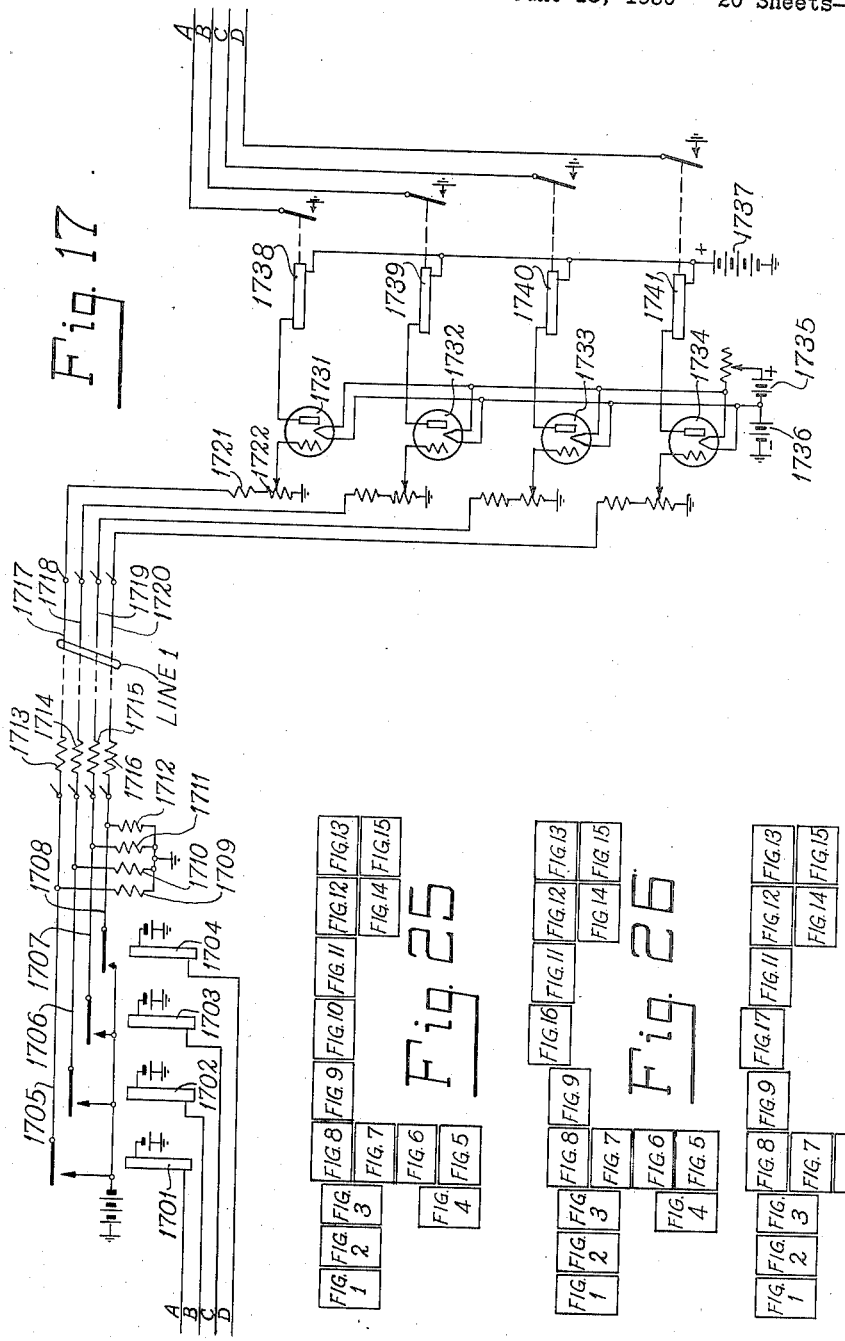

March 11, 1941. H. C. ROBINSON ET AL 2,234,684
STOCK QUOTATION SYSTEM
Original Filed June 18, 1930  20 Sheets-Sheet 20

INVENTORS
Harold C. Robinson
Martin L. Nelson
BY Davis, Lindsey, Smith & Shonts
ATTORNEYS Patented Mar. 11, 1941

2,234,684

UNITED STATES PATENT OFFICE 2,234,684

STOCK QUOTATION SYSTEM

Harold C. Robinson, Baltimore, Md., and Martin L. Nelson, Park Ridge, Ill., assignors to Associated Electric Laboratories, Inc., Chicago, Ill., a corporation of Delaware Original application June 18, 1930, Serial No. 462,114. Divided and this application February 1, 1939, Serial No. 254,120

9 Claims. (Cl. 177—353)

The present invention relates to stock-quotation systems, but is concerned more particularly with systems of this kind wherein the transmitter comprises a register sender and wherein the receiver comprises a plurality of indicating devices responsive to the impulses received from the transmitter.

This application is a division of application Serial No. 462,114, filed June 18, 1930. In the parent application, the main object, broadly stated, is the production of a new and improved transmitting and receiving system for transmitting information regarding the selling price of stock and similar commodities, so that such prices may be received and set up on indicators at a plurality of points.

This divisional application covers certain of the novel features of the new and improved stock-quotation receiver, used wherever the quotations are to be displayed.

The system herein disclosed may be considered an improvement on the system disclosed in the application of Bellamy et al., Serial No. 378,208, filed July 15, 1929; on the application of Bellamy, Serial No. 413,205, filed December 11, 1929; and on the application of Nelson et al., Serial No. 445,746, filed April 19, 1930. These applications are now respectively Patents 2,096,954, 2,095,730 and 2,103,296 dated respectively October 26, 1937, October 12, 1937, and December 28, 1937.

As pointed out in the prior applications, the more common method employed by stock brokers is to post on a blackboard the stock-market prices so that they and their customers may readily see them. In order to secure a quicker and more efficient posting of the stock-market quotations, it is proposed in the said prior applications to provide each of a plurality of stock broker's offices with a mechanical indicating board, with a separate group of indicators on each board in a broker's office for each stock in which the broker is interested, and to furnish receiving and indicator-controlling apparatus at each receiving board, all controlled from a common transmitting point.

The present arrangement has to do with improvements on a system such as outlined briefly above, and it contains the following outstanding features:

1. The stock-quotation digits are transmitted in code by means of different combinations of four characters as in the Bellamy et al. and the Bellamy applications referred to, and in order to increase the speed and reliability, a separate channel is provided on the interconnecting line for each of the four characters employed, so that all characters of a digit may be transmitted simultaneously. According to one method of carrying out the invention, the four channels are provided over a loop circuit by employing four different frequencies of alternating current, while according to another method of transmission the four channels are provided by employing four separate conductors between the transmitter and the receivers; and the receivers respond in one case by line relays directly connected in the four conductors, and in another case by having vacuum-tube repeaters responsive to voltage variations on the four interconnecting conductors rather than to current impulses as in the case of the modification employing line relays in the receivers.

2. According to a further feature of the present system, arrangements are made for transmitting the impulses from either of the two working transmitters at the transmitting station to the corresponding receiver groups over the same set of conductors. According to one method of transmission, this is done by providing interlocking starting circuits so that only one transmitter can be operating at a time, in combination with an arrangement in each transmitter for sending out a preliminary impulse over a channel indicative of the transmitter about to send a quotation, together with responding means at the receiving pairs for connecting up the correct receiver at each receiving pair, depending upon the channel over which the preliminary digit is received. According to another method of transmission, eight channels are provided instead of four, one operating transmitter using the first four channels, while the other transmitter uses the other four channels. In the case of the tuned alternating current method of transmission, eight frequencies instead of four are provided, while in the case of the direct-current method of transmission over four conductors, four channels are obtained by sending impulses of one polarity over the four conductors, while four additional channels are obtained by sending interspersed impulses of the opposite polarity, the receivers being arranged to receive the impulses by means of polarized line relays or by means of differentiating vacuum tubes with their grids connected to the line conductors.

3. According to a further feature of the present system, the method of transmitting and receiving signals by means of direct current impulses and receiving vacuum tubes is rendered more nearly independent of differences in ground potential between the transmitting point and any receiving point by increasing the transmitting voltages sufficiently that they are very much higher than any difference in ground potential that may be encountered, while (by means of a grounded, tapped resistance) the voltage is lowered at each receiving station to a value suited to the requirements of the vacuum tubes.

4. It is a feature of the improved receiving circuits that the price-range register (the register which records the price-range digit) not only conditions the receiver for restoring the proper number of stock registers in a selected group, as in the Bellamy application hereinbefore referred to, but also shifts the receiving circuits so that the received price digits will be registered on the correct ones of the price-digit registers when the price-range digit indicates that less than four price digits are to be received.

5. It is a feature of the system disclosed herein that, upon the failure of any price digits to be set up in a quotation, a price-range digit is automatically transmitted of a value to cause all stock registers in a selected group to be restored to blank position just as though four price digits were to be transmitted, giving an automatic wipe-out of the selected group of stock registers, as no resetting impulses are sent to the restored registers, because no price digits are transmitted.

Other objects and features of the invention, for the most part incidental to those hereinbefore stated, will become apparent upon a further perusal of the specification.

GENERAL DESCRIPTION

Referring now to the drawings, comprising Figs. 1-27, they show a sufficient amount of equipment in a stock-quotation system to enable the invention to be understood.

Figs. 1 to 8, taken together, show a transmitter T1 at the transmitting station;

Fig. 16 shows a modification of the layout of Fig. 10 using four separate conductors to form the four direct-current channels of the tuned alternating-current system of Fig. 10;

Fig. 17 is a modification of Fig. 16 employing vacuum-tube receiving devices in place of the line relays of Fig. 16;

Fig. 21 shows the arrangement and connection of the two sets of motor-driven impulse cams at the transmitting station;

Figure 10:
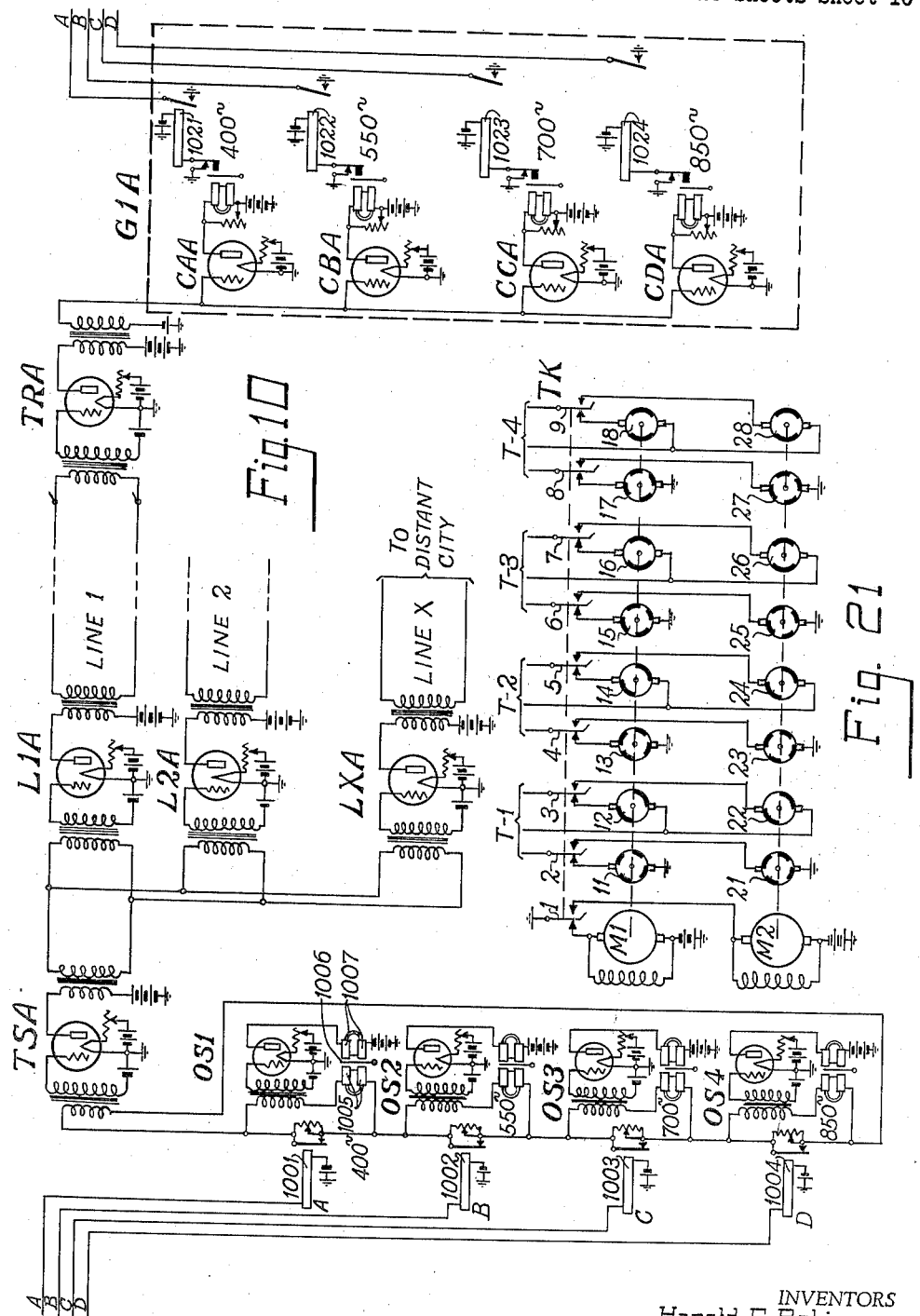
Fig. 10 shows how the four frequencies of alternating current are impressed on the transmission lines in accordance with the impulses received over the impulse conductors from the transmitter, and how they are, in turn, impressed at one of the receiving stations on the four conductors leading to a receiver pair by means of the tuned receiving apparatus.

Figs. 22 and 23 give details of one of the stock registers or indicators used in the receivers;

Fig. 24 is a table showing the code by means of which the digits of a quotation are transmitted;

Fig. 25 is a layout drawing showing how Figs. 1 to 15 should be arranged in order to be understood best;

Fig. 26 shows the layout of Fig. 25, with Fig. 16 substituted for Fig. 10; and

Fig. 27 is a layout similar to Fig. 25, with Fig. 17 substituted for Fig. 10.

As in the prior pending applications referred to, the system disclosed herein is arranged on the assumption that two operators will be required to set up the quotations at the transmitting station. Each operator is provided with two complete transmitters, and a transfer key is arranged so that the operator can place either one in service at will. Since the stocks are identified by the letters of the alphabet, some stocks being identified by a single letter, others by means of two letters, and still others by means of three letters, the division of labor between the two operators may be conveniently made by assigning to one operator all stocks identified by the letters A to M and all stocks having the initial letter A to M, and by assigning the remaining stocks to the other operator. Since the listing of stocks may not be equalized amongst the various letters of the alphabet, the two transmitters (T1 and T2) assigned to the first operator are arranged to transmit stocks having an initial letter from A to R, while the transmitters (T3 and T4) assigned to the second operator are arranged to transmit stocks identified by or having an initial letter K to Z. In this way, the line of division between the two operators may be shifted from time to time as becomes necessary.

In the brokers' offices, two receivers are used, one to receive quotations transmitted by one operator, and the other to receive quotations transmitted by the other operator, and an indicating board is provided common to both receivers. On the indicating board, indicating stock registers of the type shown in Figs. 22 and 23 are arranged in groups of twenty, one group for each stock being dealt in by the broker in whose office the indicating board is installed. A group of stock registers is shown diagrammatically in the lower right-hand corner of Fig. 15, the registers being arranged in five horizontal rows, with four stock registers in a row. In any row, the stock registers indicate the hundreds, tens, units, and fractions digits, respectively. The top row (YC) is arranged to indicate yesterday's closing price; the second row (OP) indicates today's opening price; the third row (HI) indicates the high price of the day; the fourth row (LO) indicates the low price of the day; and the bottom and fifth row (LA) indicates the last price. Each receiver comprises receiving apparatus for receiving the digits transmitted by the corresponding transmitter and apparatus for selecting the indicated stock group and for operating the registers therein to set up the price digits of the received quotation.

A three-digit code is assigned to each stock, whose quotations are to be transmitted by a given transmitter, and translating arrangements are provided for translating the stock-letter designation of a stock into the assigned group of code digits, which code digits are transmitted along with the quotation to enable the receivers to select the corresponding group of stock registers on the indicating board.

The transmitter

Figure 1:
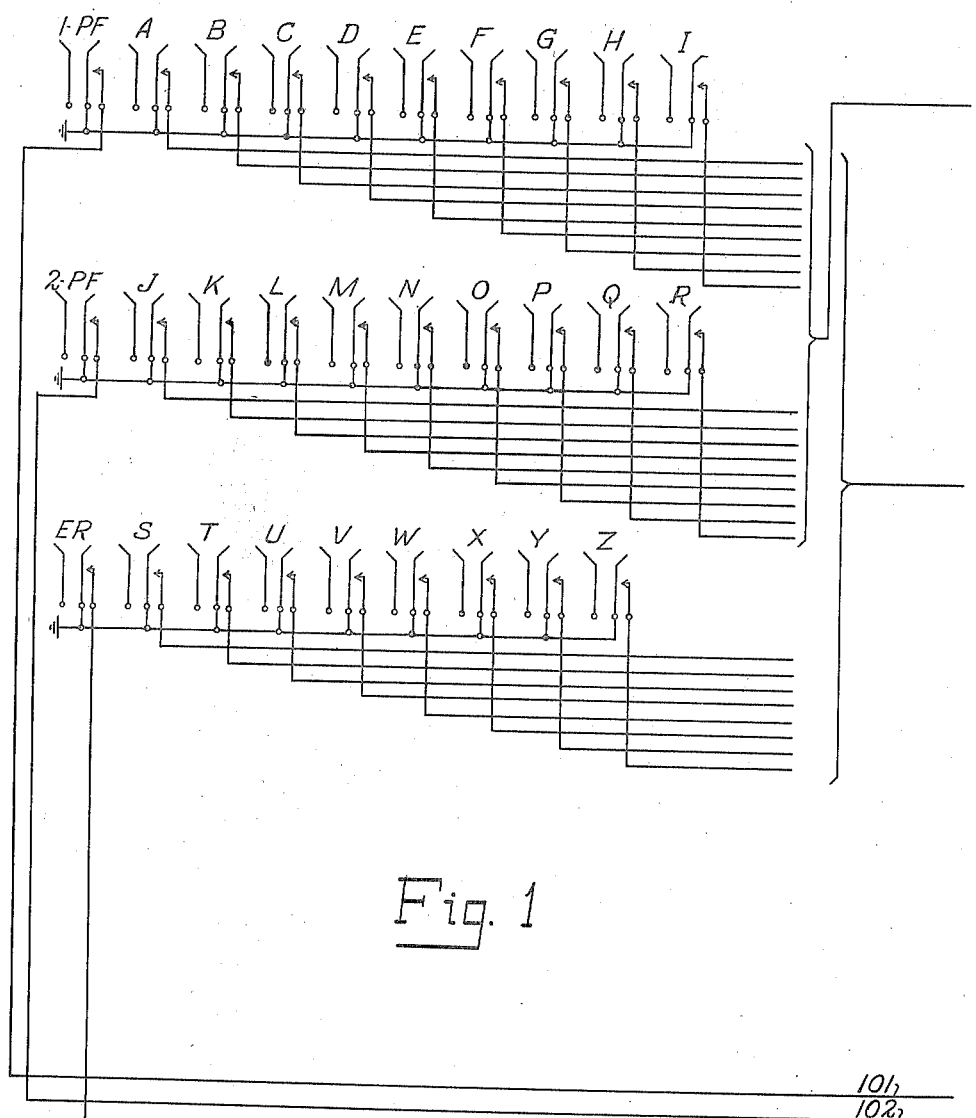
Figure 2:
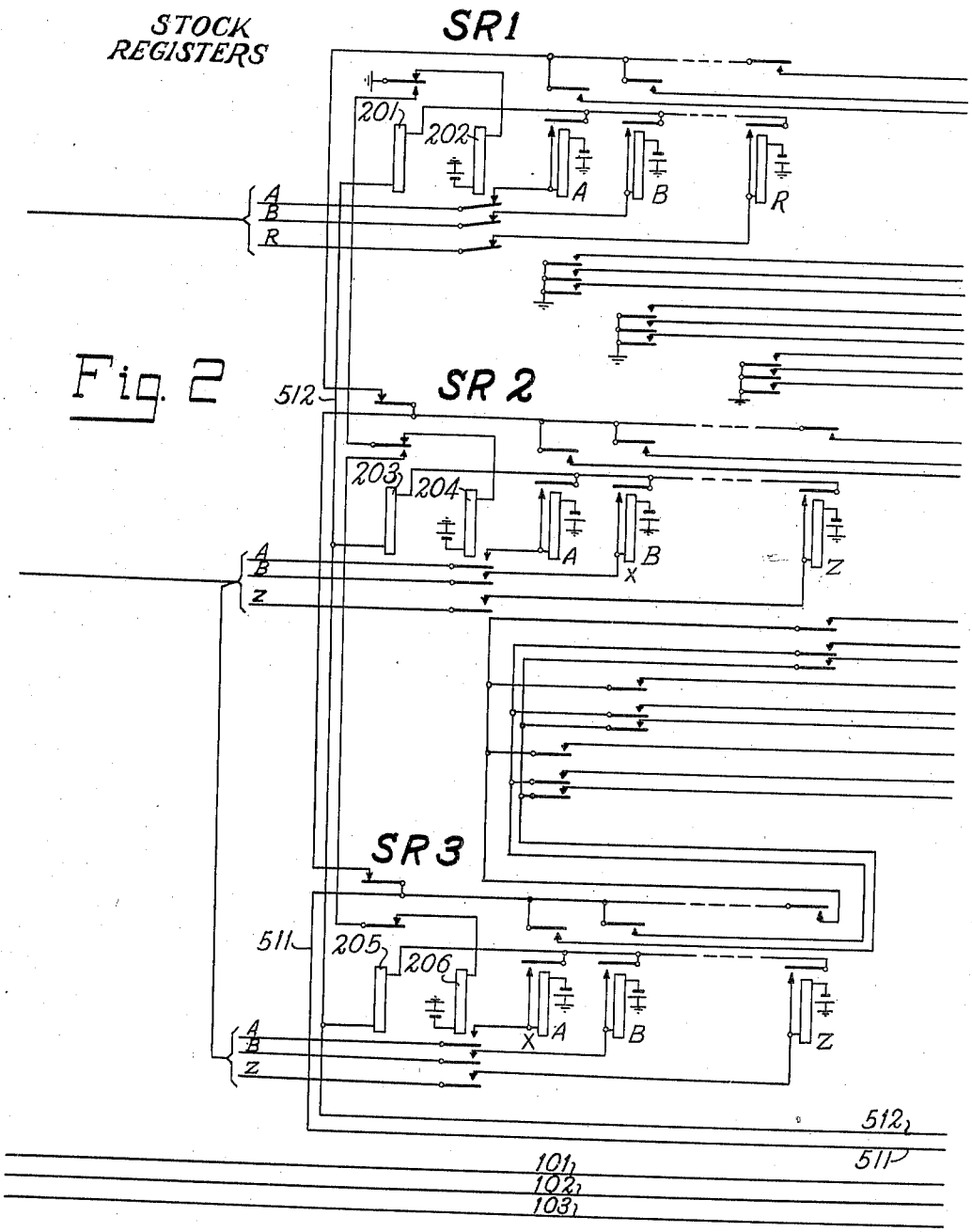
Figure 3:
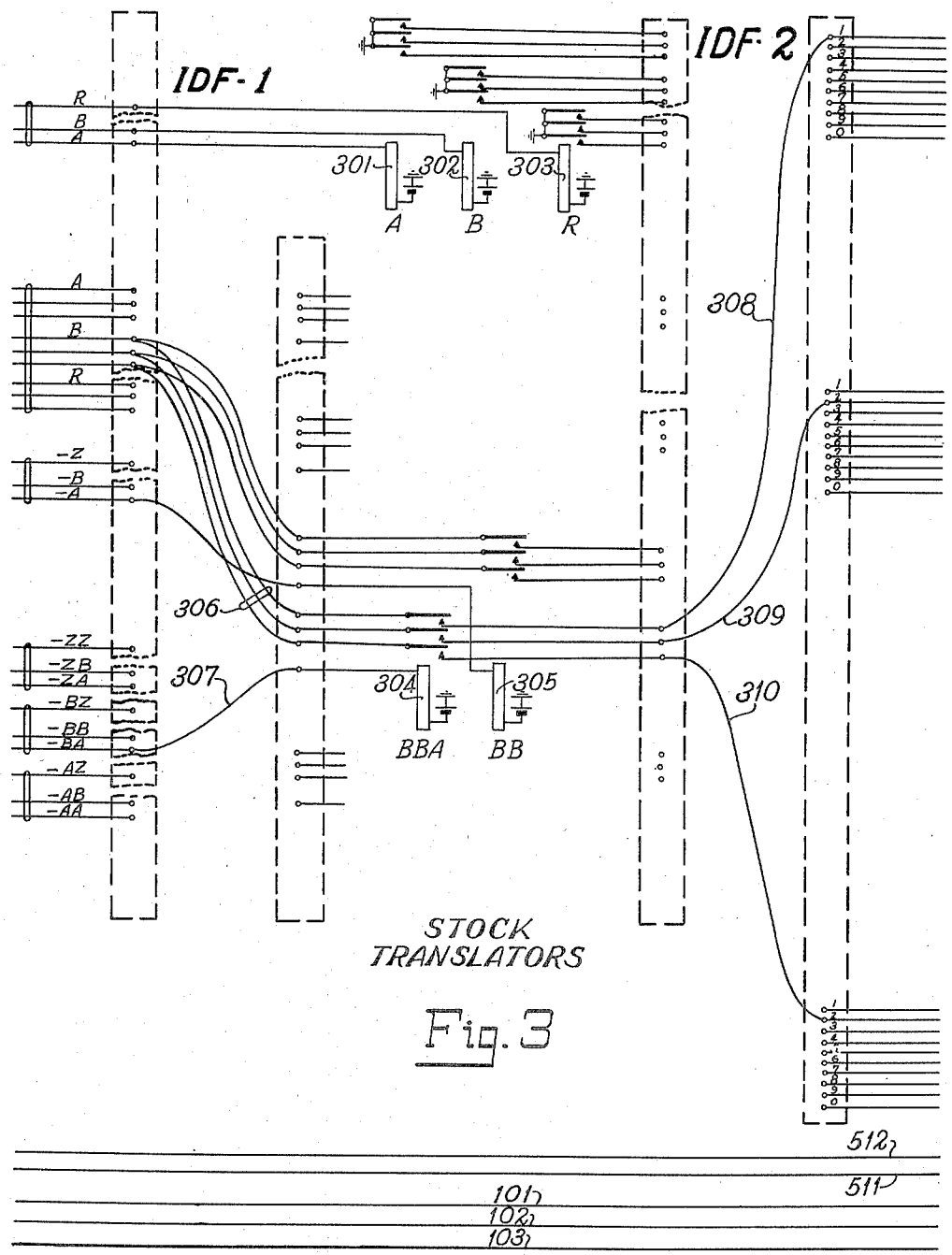

Referring now particularly to Figs. 1 to 8, the arrangement of the transmitter T1 will be explained generally. Fig. 1 shows the stock-letter keys by means of which the identifying stock letters are set up; Fig. 2 shows the stock-letter registers SR1, SR2, and SR3 which register the first, second, and third letters, respectively, of a stock-letter designation; Fig. 3 shows the translating apparatus by means of which the registered stock letters are translated into stock-code digits; and Fig. 4 shows a set of digit keys by means of which the price digits of a stock quotation are set up, and a set of range keys by means of which a range digit is set up for the purpose of causing a range digit to be sent out to direct the quotation to the proper row or rows of registers in a selected stock group.

In addition to the apparatus in Figs. 1 to 4, each transmitter has two register sets and a sender. Register set #1 comprises the registers of Figs. 8, 7, 6, and 5, SH, ST, SU, PH, PT, PU, PF, and SR, while register set #2 is indicated by the rectangle at the bottom of Fig. 5 (register set #2 being a duplicate of register set #1).

Figure 5:
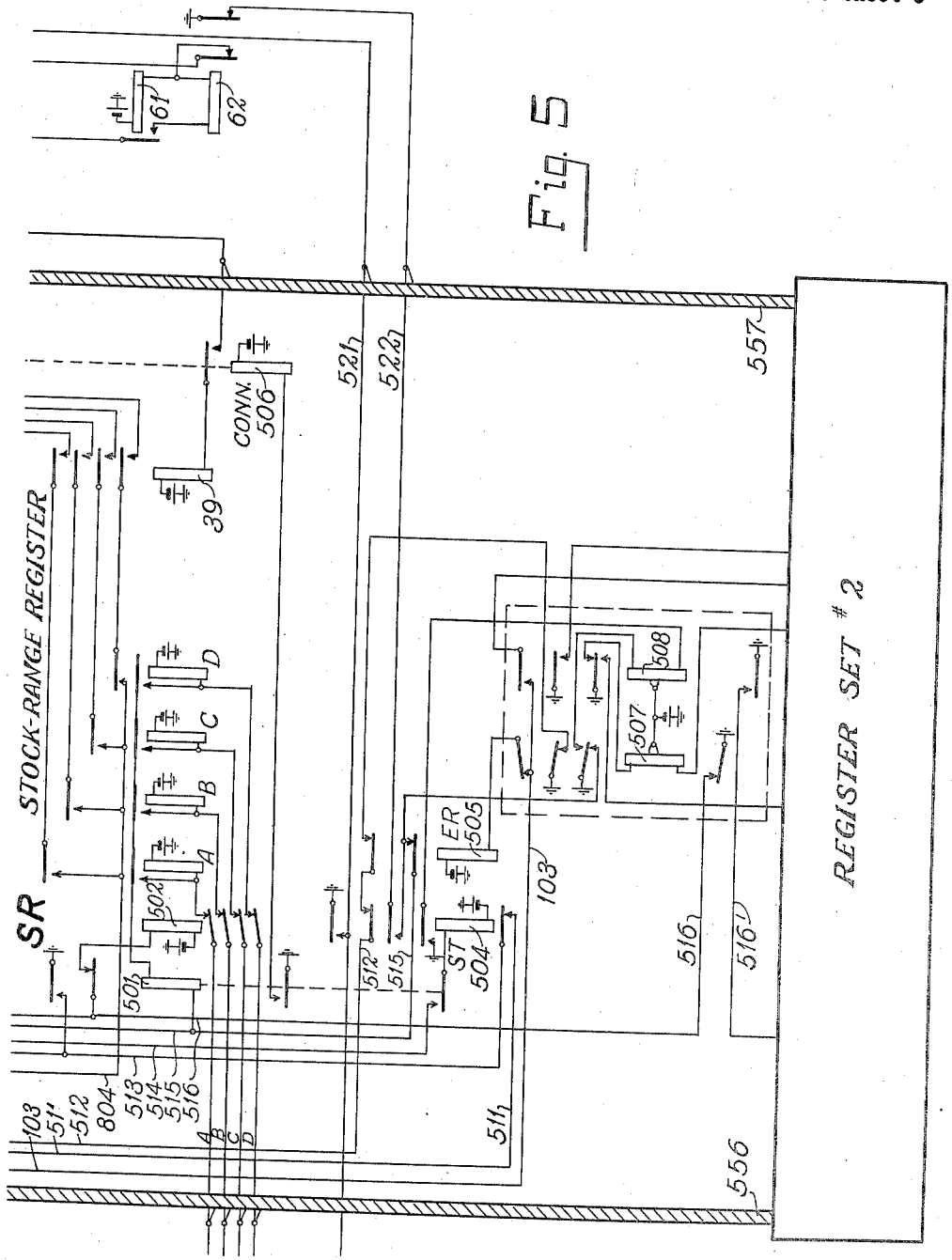
Figure 6:
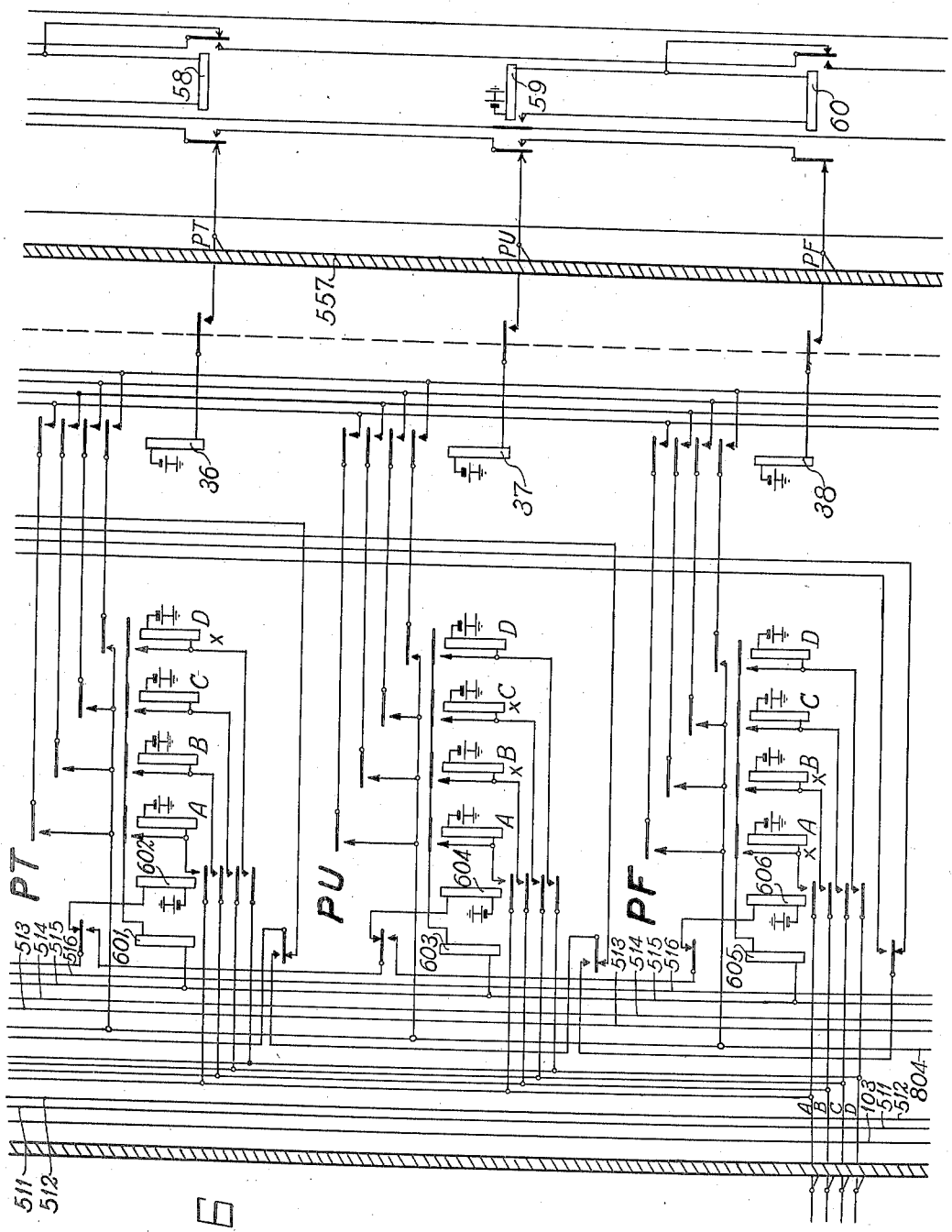
Figure 7:
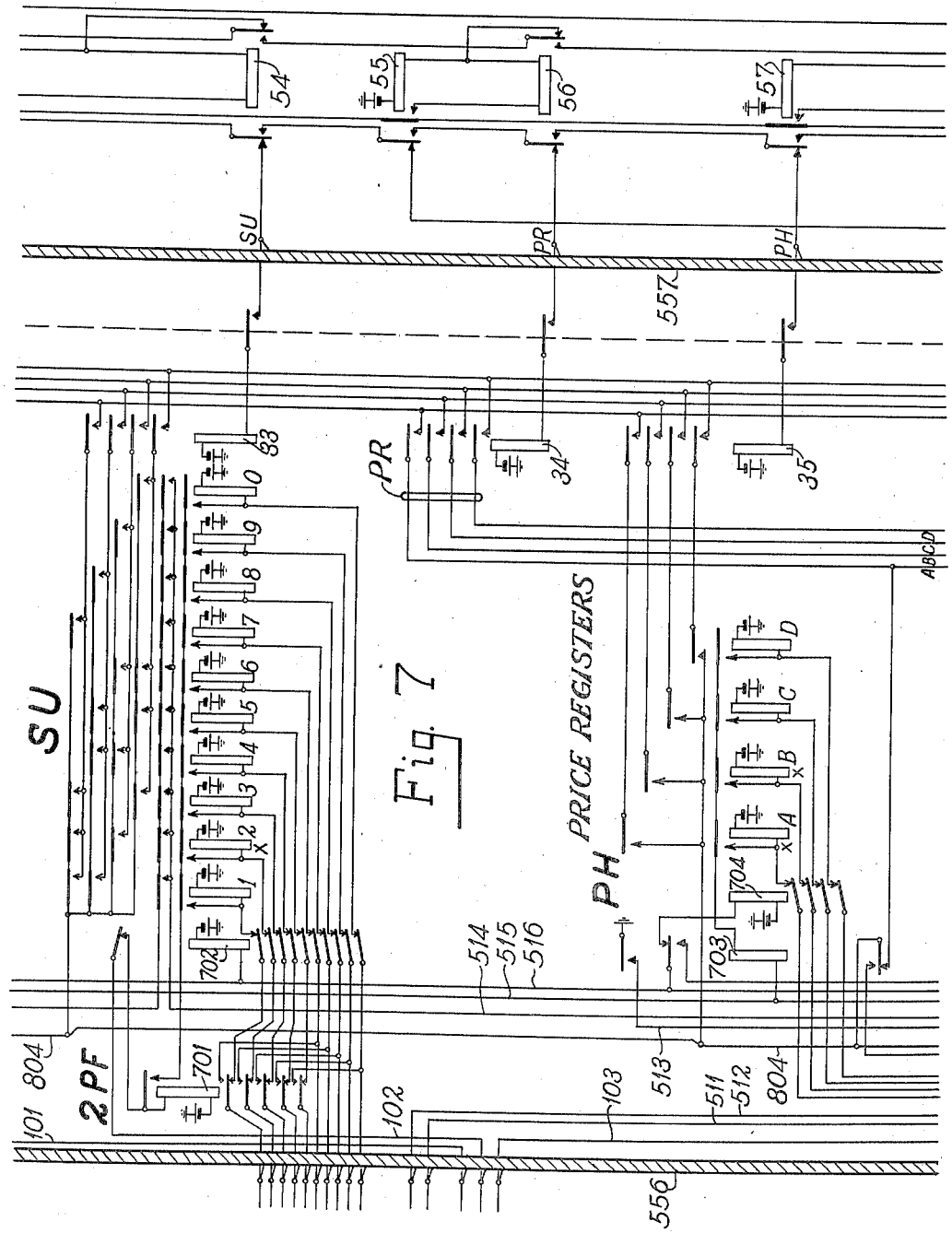

In the register set #1 the registers SH, ST, and SU register the stock-hundreds, stock-tens, and stock-units digits of the translated stock code; registers PH, PT, PU, and PF of Figs. 7 and 6 register the hundreds, tens, units, and fractions price digits set up successively on the price-digit keys of Fig. 4; and the stock-range register SR of Fig. 5 registers the stock-range digit set up on the stock-range keys of Fig. 4. The sequence relays 507 and 508, Fig. 5, are arranged to be operated alternately to associate the register sets alternately with the apparatus of Figs. 1 to 4.

The sender consists of the apparatus of Figs. 5 to 8, to the right of the tie-cable 557 (which is used to interconnect the two register sets), and is arranged to control the sending relays 31—39 of register set #1 and the corresponding relays of register set #2 to send out the registered digits.

The receiver

Figure 11:
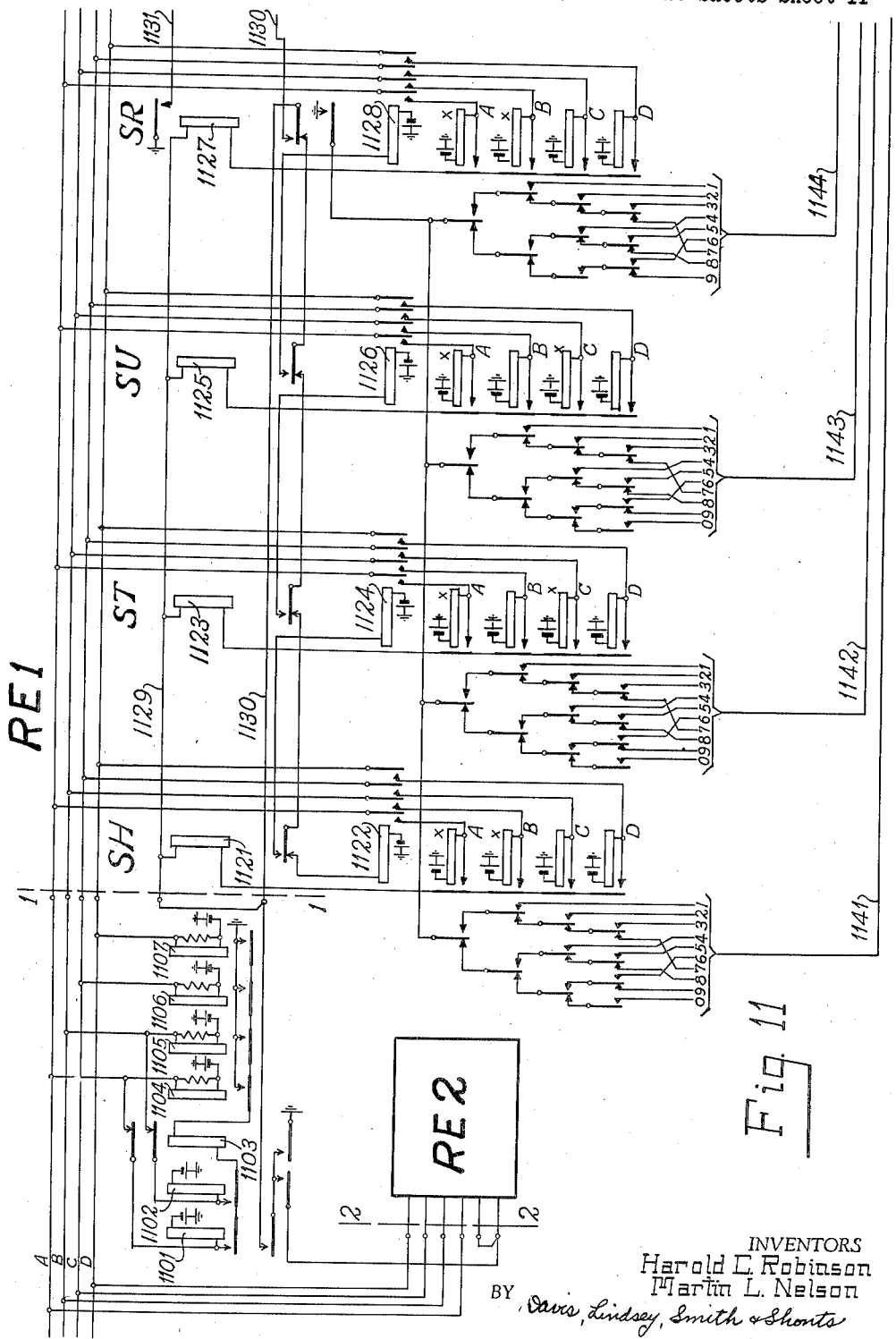
Figs. 11-15 show a pair of receivers.

Referring now to Figs. 11 to 15, the pair of receivers shown therein will be explained generally. The receiver RE2 is indicated in Fig. 11 by the rectangle bearing that reference character, while the receiver RE1 consists of equipment in Figs. 11 to 15 to the right of the dotted line 1—1, the receiver RE2 being a duplicate of the receiver RE1. The registers SH, ST, and SU of RE1 respond to the three stock-code digits sent out by the transmitter T1 of Figs. 1 to 8 or by the transmitter T2, Fig. 9, depending upon which one is in use;

The register SR registers the stock-range digit;

The price-range register PR registers the price-range digit; and

The registers PH, PT, PU, and PF register the price-hundreds, tens, units, and fractions digits, respectively.

Figure 13:
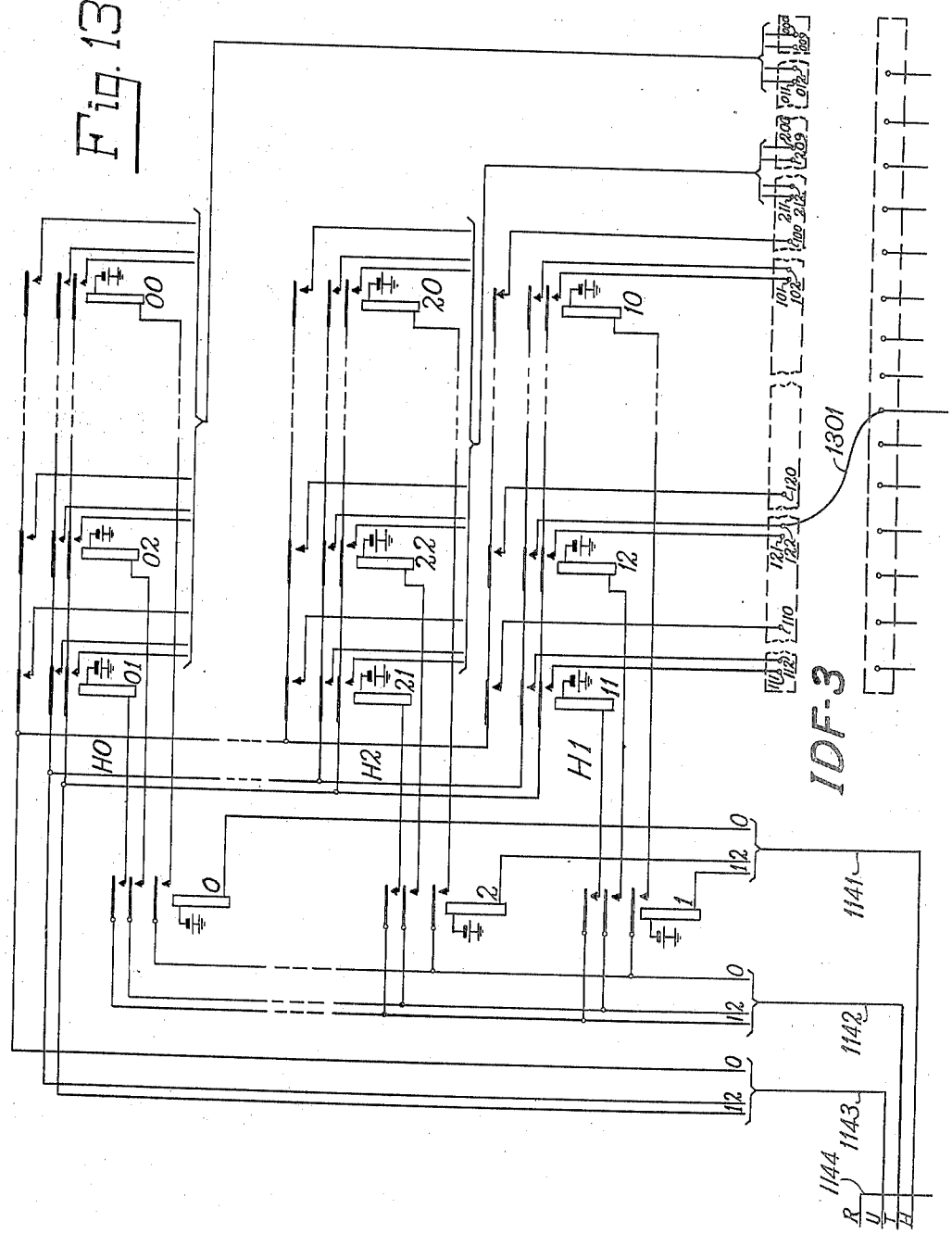

Fig. 13 shows the stock-selecting relays which cooperate with the registers SH, ST, and SU of Fig. 11 to select any one of a possible one thousand stock relays (such as 1510) to connect the common actuating conductors to the desired group of stock registers.

Figure 12:
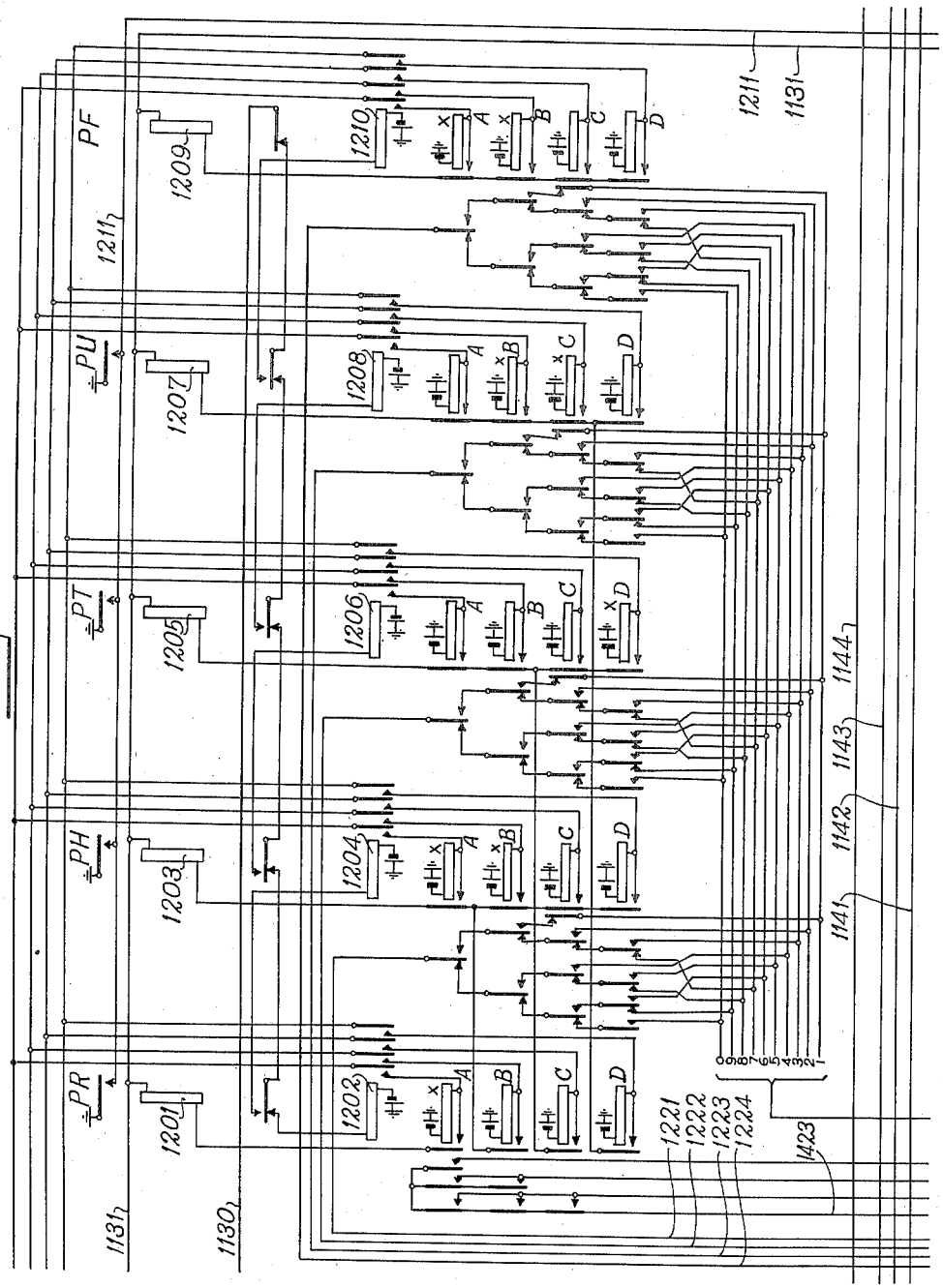
Figure 14:
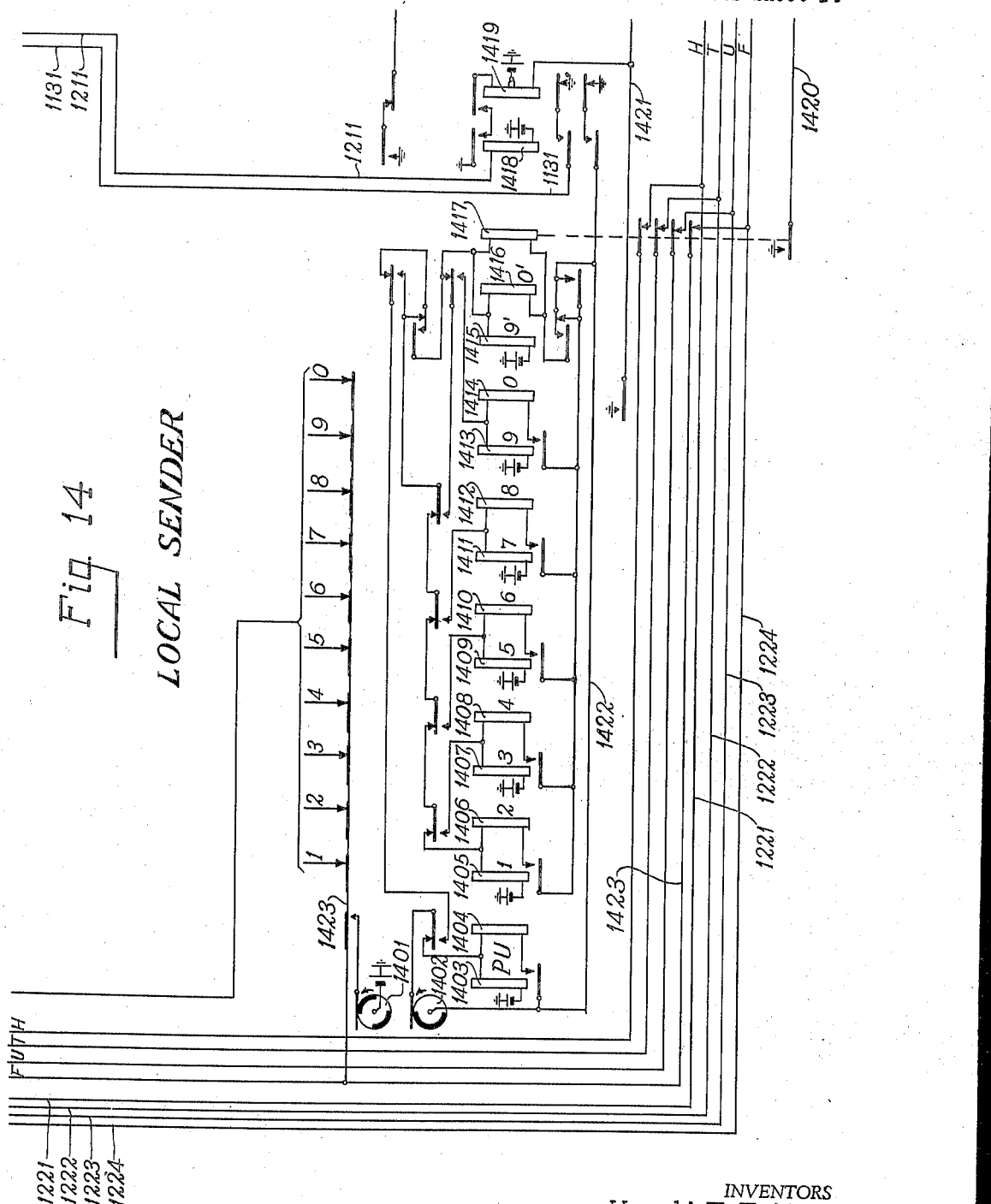
Figure 15:
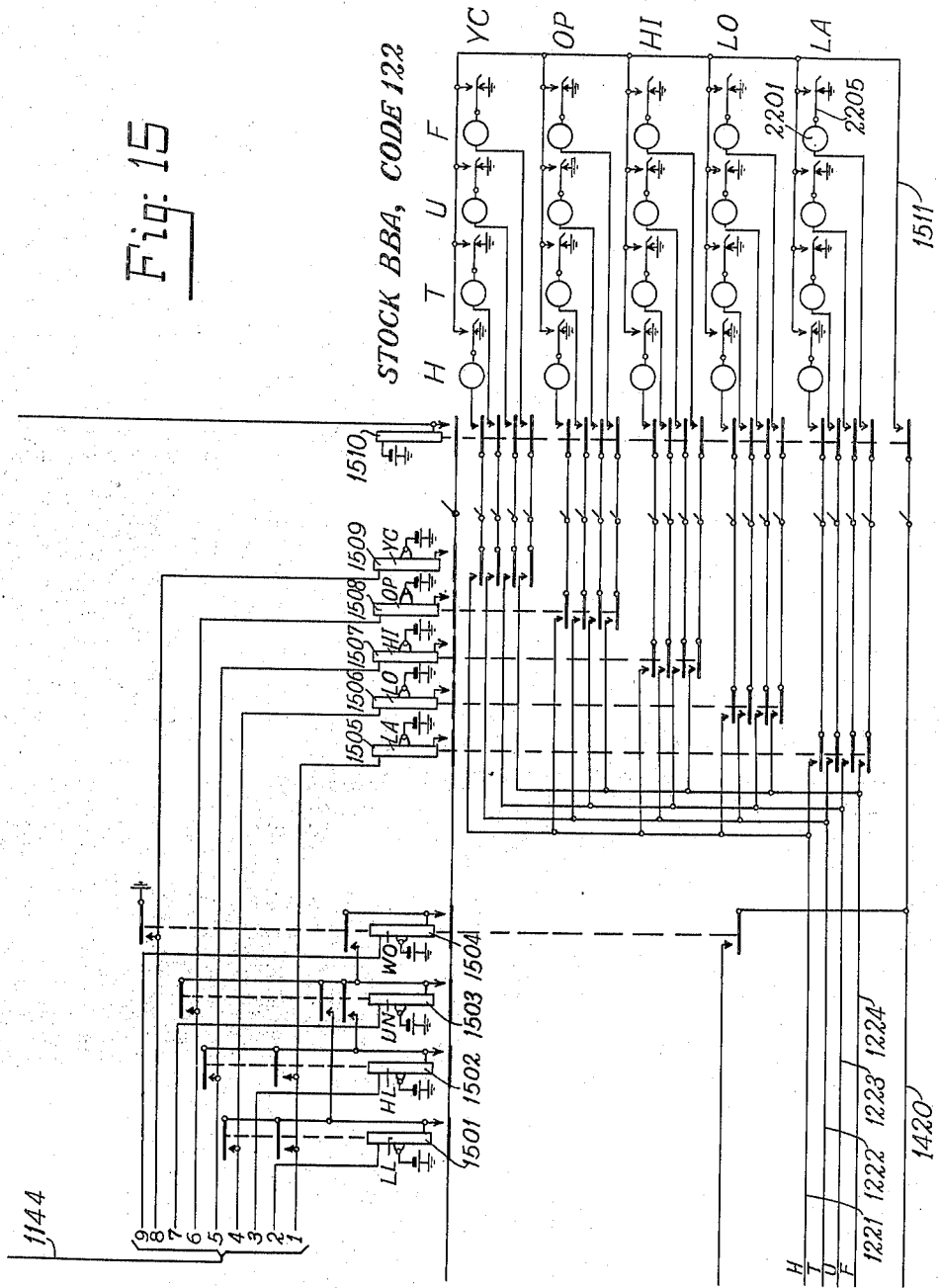

Fig. 14 shows the local sender which operates to send impulses, as determined by the setting of the registers of Fig. 12, to restore and reset the stock registers such as those in the lower right-hand corner of Fig. 15; while Fig. 15 shows, in addition to the group of stock registers in the lower right-hand corner thereof, a group of stock-range relays operated under the control of the stock-range register SR, Fig. 11, to determine which row or rows, of the selected group of stock registers is to be connected up for operation.

Detailed description

The system having been described generally, a detailed description of the operation of the apparatus shown will now be given. For this purpose a description will be given of the operations involved when the operator at the transmitter T1 shown in Figs. 1 to 8 sets up the quotation BBA—104⅛—LA. The stock-letter prefix BBA is a letter prefix by means of which the stock is identified to the operator; the middle portion 104⅛ of the quotation indicates one hundred four and one-eighth dollars; and the suffix LA is added by the operator to indicate that the quotation is to be set up as the last price.

Stock registration

To set up this quotation, the operator first operates the letter key B, Fig. 1, thereby closing a circuit from ground over the associated conductor and through contacts of the normally-operated connecting relay 202 for relay B in the stock register SR1. Upon operating, relay B closes its contacts, preparing certain circuits to be hereinafter explained, and closing a locking circuit for itself at its inner-upper contacts through the winding of the transfer relay 201 to the grounded conductor 512. Assuming that the register set #1 is connected up because relay 507 is energized and relay 508 is deenergized as shown, conductor 512 is grounded through contacts of relays 504, 505, and 507.

The transfer relay 201 remains non-operated as long as the key B is depressed because it is short circuited by ground potential applied to both terminals, but it operates as soon as the operated key is released, obtaining its operating current through the associated relay B. Upon operating, relay 201 opens the circuit of connecting relay 202 and closes a circuit through contacts of the transfer relay 203 for connecting relay 204. Accordingly, relay 202 falls back and disconnects the keys A to R from the relays A to R of the stock register SR1 and relay 204 operates to connect all of the keys A to Z to the register relays A to Z on the stock register SR2.

It may be pointed out that only eighteen register relays are used in the stock register SR1, on account of the fact that the No. 1 operator does not ordinarily use any first-letter keys other than the first-letter keys A to M, the relays N to R of the register SR1 being provided in order that a shift in the division point of labor between the two operators may be made in the direction of the letter R if it becomes necessary.

When the operator reoperates the key B, Fig. 1, to register the second letter B in the quotation, relay B of the stock register SR2 operates through contacts of the now-operated relay 204 and, in addition to closing its other contacts, closes a locking circuit for itself at its inner-upper contacts through relay 203 to the grounded locking conductor 512. As a result, transfer relay 203 responds when the key B is released the second time, opening the circuit of connecting relay 204 and transferring the operating ground potential through contacts on transfer relay 205 to connecting relay 206. Relay 204 now falls back and relay 206 operates.

When the operator manipulates her key A to register the third letter A in the quotation, relay A of the stock register SR3 operates, and at its inner-upper armature closes a locking circuit for itself in series with transfer relay 205. As a result, transfer relay 205 operates when the key A is released, and opens the circuit of connecting relay 206, whereupon relay 206 falls back.

Price registration

In order to set up the price digits 1, 0, 4, and 1, the operator employs the price-digit keys of Fig. 4. It will be noted that the connecting relay 704 of the price-hundreds register, Fig. 7, is now energized through contacts of transfer relay 703 and the grounded conductor 516, conductor 516 being grounded through contacts of the operated relay 507. Accordingly, when the digit-1 key of Fig. 4 is depressed, a circuit is closed over the associated A and B conductors (in accordance with the code given in the code table, Fig. 24, wherein the digit 1 is represented by the characters A and B) for relays A and B of the price-hundreds register PH through contacts of the energized connecting relay 704. Relays A and B operate and, in addition to preparing sending circuits, close locking circuits for themselves at their resepective inner-upper armatures through the transfer relay 703 to the locking conductor 515, conductor 515 being grounded at this time through the inner contacts of the error relay 505, and contacts of the operated relay 507. Accordingly, when the price-digit key 1, Fig. 4, is released, relay 703 operates in series with the associated relays A and B and at its inner-upper armature disconnects the grounded conductor 516 from connecting relay 704 and extends it through contacts of transfer relay 601 to connecting relay 602. Accordingly, connecting relay 704 falls back and disconnects the conductors A to D associated with the price-digit keys from the relays A to D of the price-hundreds register PH, and relay 602 connects these conductors to the relays A to D of the price-tens register PT.

In a similar manner the price-tens digit 0 is set up on the price-tens register PT by the operation of the relay D in the price-tens register; the price-units digit 4 is set up in the register PU by the operation of relays B and C therein; and the relays A and B in the price-fractions register PF are energized to register the price-fractions digit 1, the relays 601—606 operating in a manner similar to that described in connection with the corresponding relays 703 and 704.

Stock-range registration

The operator sets up the range suffix LA of the quotation by depressing the last-price range key LA, Fig. 4, the key LA corresponding to the digit 1. Accordingly, conductors A and B are grounded, closing a circuit through contacts of the operated connecting relay 502 of the stock-range register SR for relays A and B therein. Relays A and B operate and close locking circuits for themselves through transfer relay 501, with the result that relay 501 operates when the range key LA is released, opening the circuit of connecting relay 502 and permitting this relay to restore.

Stock translation

When the transfer relay 703 of the price-hundreds register PH, Fig. 7, energizes upon the registration of the price-hundreds digit as hereinbefore described, it places ground potential at its upper contacts on conductor 513, thereby extending ground potential through the lower contacts of start relay 504 to the translation-start conductor 511 extending to the stock registers of Fig. 2. Ground potential is thereby connected to the upper armatures of the register relays A to Z of the third-letter register SR3, Fig. 2. Since relay A in the register SR3 is energized, and since relay B in the register SR2 is energized, ground potential is extended through contacts of these two relays in series to conductor —BA, thereby closing a circuit through jumper 307 for stock-translating relay 304 (BBA). Relay BBA operates and places ground potential on the jumpers 308, 309, and 310 at the intermediate distributing frame IDF—2, the armatures of relay 304 being grounded through contacts of the operated relay B in the stock register SR1 and the three jumpers 306 on the intermediate distributing frame IDF—1. The grounding of jumpers 308, 309, and 310 on the intermediate distributing frame IDF—2, closes circuits for the first, second, and second register relays in the registers SH, ST, and SU, respectively, Figs. 8 and 7. These relays operate and each of them closes a locking circuit for itself at its inner-upper armature to the grounded locking conductor 515.

It may be pointed out that in practice there are usually other relays, in addition to relay 304, connected to the —BA conductor by means of other jumpers similar to the jumper 307, in which case these other relays operate at the same time that relay 304 operates. These other translating relays control different connections on the intermediate distributing frames IDF—1 and IDF—2, corresponding to different letter relays in the register SR1, and, therefore, are ineffective at this time.

In case a two-letter stock designation is set up, no register relay in the register SR3 of Fig. 2 is operated, and transfer relay 205 is consequently not operated. As a result, the ground potential on translation-start conductor 511 is extended through contacts of the non-operated transfer relay 205 to the upper armatures of the register relays A to Z of the register SR2. In case relay B of register SR2 is operated, the circuit continues through a jumper on the frame IDF—1 to stock relay 305 (BB). Relay 305 is accordingly operated whenever a two-letter code is set up of which the second letter is B, and with the jumpering as shown on the frame IDF—1, the operation of the relay is effective to extend ground potential to the left-hand side of the frame IDF—2 and thence by way of jumpers (not shown) to the code register relays of Figs. 8 and 7.

It will be noted that in case only a single-letter stock destination is set up, no relays are operated in the stock register SR2, and the ground potential of translating-start conductor 511 is extended through contacts of the non-operated transfer relays 205 and 203 to the upper contacts of the register relays A to R of the stock register SR1. Accordingly, one of the single-letter stock-translating relays, such as 301, 302, and 303, is operated in this latter case.

In the register set #1, Figs. 5 to 8, with a register relay in each of the registers SH, ST, and SU operated, a circuit is prepared from ground through the contacts of the three operated register relays and over conductor 514 for start relay 504, which circuit is held open, however, at the lower contacts of transfer relay 501 of the stock-range register SR until relay 501 is operated upon the completion of the registration of the stock-range digit, it being kept in mind that the translation takes place responsive to the registration of the first price digit on the register PH of Fig. 7, while the stock-range digit is the last digit to be registered.

Connecting the register set to the sender

When the transfer relay 501 of the stock-range register SR operates as hereinbefore described upon the registration of the stock-range digit, it closes a circuit at its inner-lower armature for connecting relay 506, whereupon relay 506 connects the sending relays 31—39 of register set #1 to the sender preparatory to the operation of the sending relays 31 to 39 to send out the registered digits.

Releasing the stock registers

As a further result of the operation of relay 501, the circuit prepared over conductor 514 upon the completion of the stock translation for start relay 504 is closed at the lower contacts of relay 501, whereupon start relay 504 operates, and at its lower armature removes ground potential from the translation start conductor 511, thereby opening the circuit of stock-translating relay 304, Fig. 3, permitting this relay to fall back. Start relay 504 also removes ground potential from the locking conductor 512, whereupon the operated relays in the stock registers of Fig. 12 fall back.

Transfer to register set #2

As a further result of its operation, start relay 504 makes an additional application of ground potential to the register locking conductor 515 of register set #1 by way of the sender branch 522 of the locking conductor to ground by way of contacts of the relay 62 of the sender; and, at its inner-upper armature, relay 504 closes a circuit for relay 508, whereupon relay 508 operates and at its inner-upper armature opens the holding circuit of relay 507, whereupon relay 507 falls back and closes a holding circuit for the upper winding of relay 508. With relay 507 de-energized and with relay 508 operated, register set #1 is disassociated from the apparatus of Figs. 1 to 4, and register set #2 is associated therewith, ground potential being removed from connecting conductor 516 by relay 507, and ground potential being placed on the corresponding conductor 516' of register set #2 by conductor 508.

At its inner-upper armature, relay 508 replaces ground potential on the stock register locking conductor 512 by way of contacts of the error relay and start relay (not shown) of register set #2, corresponding to relays 505 and 514 of register set #1. In addition, the error relay 505 of register set #1 is disconnected, and the corresponding relay of register set #2 is connected up to the error conductor 103. It will be understood, of course, that the various conductors, with the exception of conductor 521 entering Figs. 5 to 8 from the left, are multipled into register set #2 by means of the multipling cable 556.

Stock-range keys locked

As a further result of the operation of start relay 504, the outgoing start conductor 521 is grounded, and a circuit is thereby closed for the locking magnet 402 associated with the stock-range keys. Responsive to the closing of this circuit, locking magnet 402 energizes, and by means of a mechanical interlocking device (not shown) locks the stock-range keys so that no one of them can be depressed for the time being. The lamp 401 becomes lighted to indicate to the operator that the outgoing start circuit has been closed and that the stock-range keys are locked.

Setting the register set #2

When the operator depresses her keys for the next quotation, relays in the stock registers of Fig. 2 are operated as before, and during the course of the setting-up of the quotation a transfer of the translated stock designation takes place as described hereinbefore, except that the translated digits are transferred to the stock registers in register set #2 in place of the registers SH, ST, and SU of register set #1, because connecting conductor 516 is ungrounded, while connecting conductor 516' is grounded as hereinbefore described. Also, the manipulation of the price-digit keys of Fig. 4 results in the setting up of digits in register set #2 in place of in register set #1 for the same reason. It will be recalled that the stock-range keys are locked for the time being, and the result is that if the operator is able to set up the main portion of the quotation before the transmitter has sent out the quotation registered on register set #1, she is prevented from setting up the stock-range digit of the next quotation until the locked condition of the stock-range keys has been terminated.

Connecting transmitter to line

Figure 9:
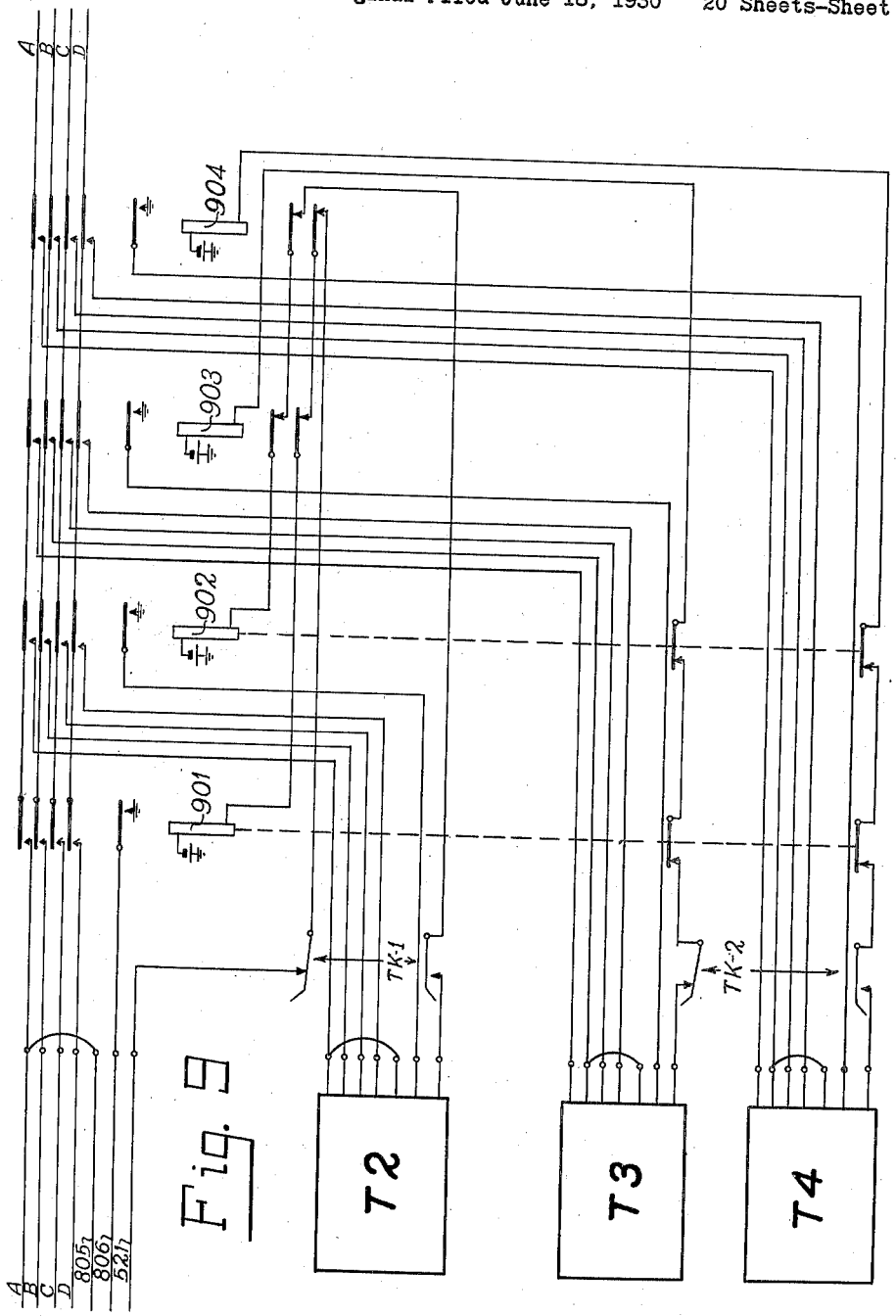
Fig. 9 shows how the four transmitters T1, T2, T3, and T4 at the transmitting station are interconnected with the outgoing impulse conductors.

As a further result of the grounding of the outgoing sender start conductor 521 by start relay 504, a circuit is prepared over conductor 521 and through contacts of transfer key TK—1, for connecting relay 901, Fig. 9, of the transmitter T1. It will be noted that the circuit is completed to relay 901 only in case relays 903 and 904 are both at normal, relays 903 and 904 being the connecting relays of the transmitters T3 and T4, used alternatively by the No. 2 operator. It will be noted also that neither of the connecting relays 903 and 904 of the transmitters T3 and T4 can operate in case either of the connecting relays 901 and 902 of the transmitters T1 and T2 is operated. This interlocking arrangement is provided for the purpose of preventing two transmitters from using the common transmitting line at the same time. The arrangement is such that whichever operator completes the setting-up of a quotation first secures the transmitting line, while the other operator is unable to secure the line until the sender of the transmitter in use by the first operator has completed its operation. In practice, when both operators are operating at about full speed, the line is used alternately by the two operators, and the transmitters run at a sufficiently-high sending rate that there is no waiting on the part of either operator.

Figure 8:
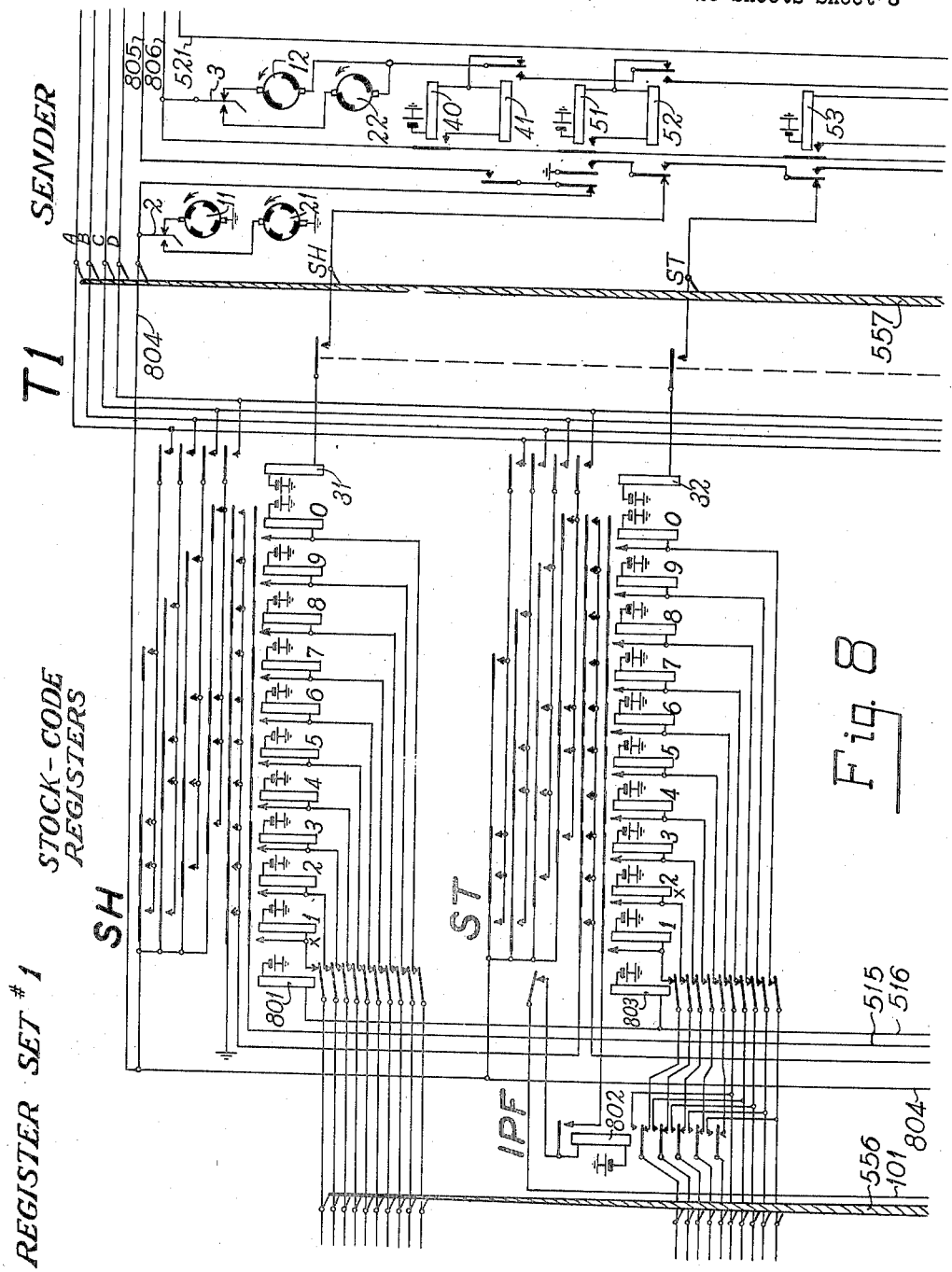

At any rate, the circuit prepared over the outgoing start conductor 521 for relay 901 through the operated upper contacts of the transfer key TK1 is closed immediately in case relays 903 and 904 are not operated, or is closed later in case one of the relays is operated at the time conductor 521 is grounded. When the circuit is completed for relay 901, relay 901 operates and connects the conductors A to D outgoing from the transmitter T1 to the conductors A to D common to the four transmitters. Relay 901 also grounds the incoming start conductor 806 of the transmitter T1, preparing locking circuits for the sender relays 40 and 41, and 51—62. The grounding of conductor 806 also results in ground potential being extended through the key spring 3 and its right-hand contact to the impulsing cam 12. It will be noted that the impulsing cams 11 and 12 in the upper right-hand corner of Fig. 8, are the first pair of cams on the motor M1 of Fig. 21. Fig. 21 shows the two sets of motor-driven cams used by the four transmitters T1, T2, T3, and T4. All the cams driven by the motor M1 are on the same shaft and, consequently, they all rotate at the same speed. The same is true of the cams driven by the motor M2, the motor M2 and the corresponding cams being held in reserve.

*Operation of sender*

With the upper brush of the cam 12 grounded responsive to the grounding of the incoming start conductor 806 of the transmitter T1 as above pointed out, a circuit is closed through the cam 12, as soon as it arrives in closed position, and through contacts of relay 41 for pick-up relay 40. Relay 40 operates and closes a locking circuit for itself to the incoming start conductor 806 through relay 41. Relay 41 does not operate immediately owing to the fact that it is supplied with ground potential at both terminals for the time being.

When the impulsing cam 12 opens, the short circuit is removed from around relay 41, permitting this relay to operate in the locking circuit of relay 40. Upon operating, relay 41 transfers the impulsing circuit from relay 40 to relay 51 at its right-hand armature, and at its left-hand armature it connects up the impulsing cam 11 by way of conductor 804 and contacts of relay 51 to the preliminary-impulse conductor 805. At the terminals of the transmitter T1, Fig. 9, conductor 805 is strapped to the outgoing A conductor, with the result that an identifying preliminary impulse is sent over conductor A of the common group to the line sending relay 1001, Fig. 10. Due to the angular setting of cam 11, relative to cam 12, this identifying impulse is transmitted while the cam 12 is in the second half of its open position.

A moment later, the cam 11 arrives at the next open position, and cam 12 simultaneously arrives in its closed position again, the preliminary impulse sent over conductors 804 and 805 and a sending conductor to line sending relay 1001 being thereby terminated. Cam 12 closes a circuit through contacts of relays 41 and 52 for relay 51, whereupon relay 51 operates and opens the connection between conductor 804 and the preliminary impulse conductor 805 at its outer armature; closes a locking circuit for itself at its inner armature; and at its middle armature it closes a circuit through the upper contacts of connecting relay 506, Fig. 5, for sending relay 31. Relay 31 operates and connects the conductors A to D outgoing from the transmitter T1 to the contacts of the stock-hundreds register SH preparatory to sending the stock-hundreds digit. It is to be noted that the operation of digit-connecting relay 31 takes place while the interrupter 11 is in open position.

A moment later, and while interrupter 12 is still in closed position with relay 51 directly energized, interrupter 11 arrives in closed position, during the second half of the closed position of interrupter 12, again placing ground on sending conductor 804. With relay 1 in the stock-hundreds register S1 energized, conductor 804 is connected to conductors A and B of the set outgoing from the transmitter to the line circuit, closing circuits for the line sending relays 1001 and 1002 to send the first stock-code digit 1 in accordance with the code table, Fig. 24.

A moment later, the interrupters 11 and 12 both open at the same time, and interrupter 11 terminates the digit, whereupon the energized line sending relays 1001 and 1002 fall back. The interrupter 12 opens the initial circuit of relay 51, whereupon relay 52 energizes in series with relay 51 and opens the circuit of sending relay 31, at the same time closing a circuit for sending relay 32.

During the time the impulsing cam 12 is in open position, cam 11 closes again, again grounding conductor 804, this time to send out the stock-tens digit 2 by closing circuits through the contacts of the second register relay in the register ST, and through contacts of relay 32, over the A and C conductors for line sending relays 1001 and 1003.

Just as the interrupter 11 opens to terminate the stock-tens digit and drop back relays 1002 and 1004, interrupter 12 closes again, at this time completing a circuit for relay 53. Relay 53 opens the circuit of relay 32 and closes a circuit for sending relay 33, in addition to locking itself through the winding of relay 34. As a result, while the circuit of 53 remains closed at the impulsing cam 12, cam 11 closes again and sends out the stock-units digit 2 through the contacts of the second relay of the register SU, contacts of relay 33, and over the A and C conductors to line sending relays 1001 and 1003.

When the cam 11 opens again to terminate the stock-units digit and drop back relays 1001 and 1003, the initial circuit of relay 53 is opened by cam 12, whereupon relay 54 energizes in series with relay 53 and opens the circuit of sending relay 33, at the same time closing a circuit through contacts of relay 55 and for the stock-range-digit sending relay 39, Fig. 5. As a result, the next digit to be transmitted is the stock-range digit 1 (LA).

As the cams 11 and 12 continue to operate, the sending relays 34 to 38 continue to be operated one after the other in the manner described for relays 31 to 33 and 39, and the cam 11 continues to send out a digit through the contacts of each sending relay in turn. The price-range digit is next transmitted through contacts of sending relay 34, following which the price-hundreds, tens, units, and fractions digits are transmitted through contacts of relays 35—38.

Regarding the above-mentioned transmission of the price-range digit through contacts of sending relay 34, it may be pointed out that all of the price-register transfer relays 703, 601, 603, and 605 are operated, with the result that only conductor A of the price-range group PR is connected up (at the contacts of relay 605). This results in an impulse being sent over channel A only to operate line sending relay 1001.

Clearing out the transmitter

When relay 62, the second relay of the pair, comprising relays 61 and 62, added to the sender for the purpose of introducing a time interval between quotations, operates, following the operation of relay 61, it removes ground potential from the sender branch 522 of the register-locking conductor, thereby removing ground potential from locking conductor 515 of the register set #1. When this occurs, all of the locked-up relays in register set #1, including the start relay 504 and connecting relay 506, fall back. When start relay 504 falls back, it removes the ground potential from the outgoing start conductor 521 of the transmitter T1, thereby opening the circuit of the locking magnet 402, permitting magnet 402 to deenergize and free the stock-range keys for operation.

As a further result of the removal of ground potential from the outgoing start conductor 521, relay 901, Fig. 9, falls back and disconnects the outgoing digit conductors A to D of the transmitter T1 from common digit conductors extending to relays 1001—1004. Relay 901 also removes ground potential from the incoming start conductor 806 of the transmitter T1, thereby rendering the impulsing cams 11 and 12 ineffective and opening the locking circuit of relays 40 and 41 and 51—52. The relays of the sender all fall back, and the transmitter T1 is cleared out and in readiness to handle the next quotation as soon as it is set up by the No. 1 operator.

General arrangement of the system

Referring now particularly to Fig. 10, the general arrangement of the system will now be explained. It will be recalled that the operation of the transmitter results directly in the line sending relays 1001—1004 of Fig. 10 being operated successively (singly, and in combinations) in accordance with the code table given in Fig. 24. These relays repeat the digit impulses by means of four separate frequencies of alternating current to the receivers. It is assumed that the system being described is installed in a city wherein there are a large number of brokers' offices. In such a case, the brokers' offices are divided into groups, and a separate line is run from the transmitting station to each group, the line being branched at the group of offices, with a separate branch leading to each broker's office. Fig. 10 shows two lines, line 1 and line 2, and it will be understood that as many lines as desired may be provided by merely providing an additional amplifier, such as the amplifiers L1A and L2A specific to lines 1 and 2, respectively. The purpose of amplifier LXA will be explained hereinafter.

Repeating the digit impulses

In order to generate the four frequencies of signalling current, four oscillators, OS1, OS2, OS3, and OS4, Fig. 10, are provided. As shown in the drawings, each oscillator includes a standard three-element vacuum tube, a transformer, and an electromagnetically-operated tuned-reed coupler. The tuned-reed coupler of the oscillator OS1 comprises two horseshoe magnets with windings wound on soft-iron pole pieces and designated in the drawings as 1005 and 1007. The reed 1006 is arranged to be acted upon by the electromagnet coils 1007 and to generate current in the electromagnet coils 1005 as it vibrates back and forth at a frequency of four hundred cycles per second. The tuned-reed coupling device is preferably similar to the corresponding device disclosed in the application of Laurence J. Lesh, filed April 8, 1929, Serial No. 353,283.

With the oscillator OS1 in operation, each time the reed 1006 swings to the left, a current is induced in the windings 1005, causing a current flow to be set up through the primary winding of the associated transformer, sending an impulse which is amplified by the vacuum tube and transmitted to the coils 1007. This impulse assists the reed 1006 in swinging back to the right, and an impulse in the opposite direction is sent through the primary winding of the associated transformer, causing the vacuum tube to cut down the current flow through the coils 1007 to cause the reed 1006 to swing back to the left again.

As disclosed in the above-mentioned application of Lesh, the pole pieces of the two magnets associated with the reed 1006 are preferably so located that the magnetic fields are at right angles and do not intermingle, thereby avoiding direct magnetic action between the coils 1005 and the coils 1007, resulting in the coupling being entirely through the magnetic reed 1006.

It will be noted that the reeds of the oscillators are all of different lengths, the oscillators being tuned for 400 cycles, 550 cycles, 700 cycles, and 850 cycles per second, respectively.

There is a variable resistance connected in series with the primary winding of the transformer at each oscillator. These resistances are normally shunted by the contacts of the relays 1001—1004, respectively. The resistances are all connected in series with one another and in series with the primary winding of the input transformer at the terminal sending amplifier TSA. Accordingly, with the relays 1001—1004 at normal as shown, the output terminals of the oscillators are short circuited, and they do not send current into the terminal sending amplifier. However, when one of the repeating relays, relay 1001 for example, energizes, it removes the shunt from around the associated resistance, permitting the associated oscillator to send current in the common circuit through the primary winding of the input transformer of the terminal sending amplifier. The magnitude of the current thus transmitted may be controlled by varying the adjustable resistance as desired. The total value of the resistance across the output terminals of an oscillator is relatively small so that the local operation of an oscillator is not materially effected by cutting in the entire resistance.

It may be seen from the foregoing description that any desired one of the four frequencies, or any desired combination of them may be impressed on the terminal sending amplifier. After being amplified by the terminal sending amplifier, the signals pass through the primary windings of the line amplifiers such as L1A and L2A of lines 1 and 2, respectively. Each line amplifier is arranged to amplify the signals a sufficient amount to secure their efficient transmission over the associated line. It has been explained hereinbefore that a separate line may be provided for each group of brokers' offices, and that a branch of this line extends to each broker's office of the group.

In the office of each subscribing broker, there is a terminal receiving amplifier, of which the terminal receiving amplifier TRA is shown. The signals coming in over the line are amplified the desired amount by the amplifier TRA, and are passed then to the four local channel amplifiers corresponding, respectively, to the channels A, B, C, and D, the channel amplifiers being designated CAA, CBA, CCA, and CDA. Associated with each of the channel amplifiers at the receiver, the amplifier CAA, for example, there is a polarized device having a tuned reed associated therewith, the arrangement being similar to the arrangement at the oscillator OS1 except for the fact that only a single pair of coils is provided. The reeds at the channel amplifiers are differently adjusted, being arranged to respond to 400-cycle current, 550-cycle current, 700-cycle current, and 850-cycle current, respectively. The relays 1021—1024 associated with the amplifiers CAA—CDA, respectively, are each normally energized through the associated reed-controlled contacts. When any reed is caused to vibrate with sufficient amplitude to chatter the associated contacts, the relay energized through these contacts falls back and sends an impulse to the associated pair of receivers. In this way, the relays 1021—1024 are caused to follow the operations of the line sending relays 1001—1004, respectively. Consequently, each time conductor A is grounded at the transmitting station, conductor A is grounded at each receiving station; each time conductor B is grounded at the transmitting station, conductor B is grounded at each receiving station, etc.

Operation of the receiving apparatus

It will be recalled that the transmitter T1 sent out a preliminary impulse over conductor A prior to the sending-out of the registered quotation. The preliminary impulse was sent out over conductor A rather than over some other conductor on account of the fact that the preliminary impulse conductor 805, Fig. 9, is strapped to the outgoing A conductor. The terminals of the transmitter T2 are similarly strapped, while the terminals of the transmitters T3 and T4 are strapped so that the preliminary impulse is sent out over the B conductor instead of over the A conductor. Receiver-selecting apparatus is provided at the receivers to respond to the preliminary impulse and connect up either receiver R1 of Figs. 11 to 15, or receiver R2 (indicated by a dotted rectangle in Fig. 11), depending upon whether the quotation was set up on transmitter T1 or T2 by the No. 1 operator, or set up on transmitter T3 or T4 by the No. 2 operator. The way in which this selection is performed will now be explained.

It will be noted that the incoming impulse conductors A to D, Fig. 11, are connected to the receiver R1 and also to the receiver R2. It will be noted further that the shunted relays 1104—1107 are connected to the conductors A—D, respectively. Each of these relays has a non-inductive resistance shunted around its winding so that after the relay has energized in response to an impulse, it is held operated by a self-induced current circulating through its winding and through the non-inductive resistance a sufficient length of time to enable it to hold up between impulses. Relays 1101 and 1102 are normally connected to the incoming conductors A and B, respectively, through contacts of the transfer relay 1103. When the preliminary impulse preceding a quotation comes in over conductor B, relay 1102 is operated to prepare a connecting circuit for the receiver RE2, but when the preliminary impulse is received over conductor A, as in the present case, relay 1101 is the relay operated.

Upon operating over conductor A and through contacts of relay 1103 responsive to the preliminary impulse A, relay 1101 closes a locking circuit for itself through the winding of transfer relay 1103 to ground through the contacts of relay 1104, relay 1104 also operating over conductor A. At its lower contacts, relay 1101 prepares to ground the connecting conductor 1130 in the receiver RE1.

When the preliminary impulse over conductor A is terminated, relay 1103 operates in series with relay 1101, and disconnects relays 1101 and 1102 from conductors A and B at its upper armatures, while at its lower armature it extends ground potential through contacts of the operated relay 1101 to the connecting conductor 1130 of the receiver RE1. Relay 1104, as above mentioned, is slow-acting and maintains the locking circuits of relays 1101 and 1103 intact until the first digit comes in. One or more of the holding relays 1104—1107 is always operated while a quotation is being received, as there is not sufficient space between successive digits to permit all of the relays to be deenergized at one time.

Responsive to the grounding of conductor 1130, a circuit is closed through contacts of relays 1127, 1125, 1123, and 1121, for digit-connecting relay 1122. Digit-connecting relay 1122 operates and connects the conductors A to D to the relays A to D of the stock-hundreds register SH, preparatory to the receipt of the stock-hundreds digit. As a result, when the two impulses are received over conductors A and B corresponding to the transmitted stock-hundreds digit 1, relays A and B of the register SH operate and close locking circuits for themselves in series with transfer relay 1121 to conductor 1129, which is a branch of conductor 1130. When conductors A and B are ungrounded, a moment later, transfer relay 1121 energizes in series with associated relays A and B, opens the circuit of the digit-connecting relay 1122; and closes a circuit for digit-connecting relay 1124 of the stock-tens register ST. Accordingly, the stock-tens digit 2, which is transmitted next, is received by the stock-tens register ST wherein the relays A and C are energized.

When the two impulses in the stock-tens digit subside, relay 1123 energizes and transfers the connecting conductor from relay 1124 to relay 1126, whereupon relay 1124 falls back and relay 1126 operates.

In a similar manner, the stock-units and stock-range digits are received, and the transfer relay 1127 of the stock-range register (in addition to transferring the connecting conductor from relay 1128 to connecting relay 1202, by way of conductor 1130' and contacts of relays 1209, 1207, 1205, 1203, and 1201) places ground potential on the locking conductor 1131, preparing locking circuits for the registers of Fig. 12.

The price-range digit is next received by the price-range register PR, wherein relay A is operated, following which the price digits 1, 0, 4, and 1 are received by the price registers PH, PT, PU, and PF.

Selecting the stock

When the transfer relay 1127 of the stock-range register SR operates, it grounds the contact pyramids of the registers SH, ST, SU, and SR in order to effect stock and stock-range selection. As explained hereinbefore, stock connecting relay 1510, Fig. 15, is individual to the stock BBA (code 122), and the associated group of stock registers, and there is a separate stock-connecting relay individual to each other stock dealt in by the subscribing broker on whose premises the receiver pair of Figs. 11 to 15 is installed. All told, there may be as many as one thousand stocks in the group handled by the No. 1 operator, who uses transmitters T1 and T2, in which event the stock-selecting apparatus at a receiver, such as the receiver RE1, must be able to select any one of a thousand stock-connecting relays. It is to be understood, of course, that a broker will not ordinarily deal in more than one or two hundred stocks, and that a broker has an indicating board commensurate with his needs, but in order to provide interchangeability of the receivers, and to permit the broker to change his stock offering from time to time, each receiver must be capable of selecting any one of the stocks. Accordingly, the stock-selecting relay group of Fig. 13 is assumed to comprise a maximum of 110 relays, and the upper terminal group of the intermediate distributing frame IDF—3, Fig. 13, is assumed to have one thousand terminals thereon, any one of which may be selected by the associated relay apparatus. The lower terminal strip of the intermediate distributing frame IDF—3 has as many terminals thereon as there are stock-connecting relays such as 1510, and a jumper, such as the jumper 1301, connects each relay to the desired terminal of the upper side of the frame.

The relays arranged in a vertical row at the left of Fig. 13 are hundreds-selecting relays, there being ten relays in this group, of which only the first, second, and tenth are shown. Three horizontal rows of relays are shown to the right of the hundreds-selecting relays, each row corresponding to a different hundreds group. There are ten such rows installed, of which only three are shown; and there are ten relays in each row, of which only three are shown. From the contact pyramids of the registers SH, ST, and SU, thirty conductors lead to the relays of Fig. 13, as indicated by the lines 1141, 1142, and 1143, there being ten hundreds conductors, ten tens conductors, and ten units conductors. Each hundreds conductor leads to a separate one of the hundreds relays in the vertical hundreds-selecting group at the left-hand side of the sheet, and the ten conductors from the stock-tens register ST lead to the contacts of the hundreds relays. Upon inspecting the drawings, it will be seen that, depending upon which hundreds-selecting relay is operated, and upon which tens conductor is connected up by the stock-tens register ST, any one of the one hundred relays in the groups such as H1, H2, and H9 may be operated.

In the present case, with the digits 1 and 2 set up on the registers SH and ST, respectively, relays 1 and 12 of Fig. 12 are operated. With relay 12 operated, and with the digit 2 set up on the stock-units register SU, a circuit is closed over the associated No. 2 conductor by way of the path indicated by line 1143, contacts of the operated relay 12, and jumper 1301 to the winding of stock-connecting relay 1510. Upon operating, relay 1510 connects up the associated actuating conductors to the associated group of stock registers, and at its inner armature it prepares a locking circuit for itself.

*Selecting the stock range*

With the relays A and B energized in the stock-range register SR in response to the receipt of the stock-range digit 1, corresponding to last price (LA), a circuit is closed over the associated No. 1 conductor and over the path of the line 1144 for the last-price stock-range relay 1505 (LA), Fig. 15. Relay 1505 operates and connects up the actuating conductors to the bottom row only of the stock registers in group BBA through contacts of relay 1510. At its inner armature, relay 1505 prepares a locking circuit for itself.

*Restoring the stock registers*

The stock registers in the bottom row of group BBA (code 122) Fig. 15, having been selected as described, the next operation to be performed is the restoration of the selected registers to blank position. The way in which the selected stock registers are restored will now be explained. When the transfer relay 1201 of the price-range register PR operates, it grounds start conductor 1211 to operate start relay 1418. The locking circuits of the operated relays 1505 and 1510 are closed by relay 1418 through contacts of relay 1419. Relay 1418 also makes a multiple ground connection to locking conductor 1131 through contacts of relay 1419. In addition, start relay 1418 places a ground potential on the locking and operating conductor 1422 of the local sender. After this happens, as soon as the relay-operating cam 1402 arrives in closed position, a circuit is closed through contacts of relay 1404 for pick-up relay 1403. Relay 1403 operates and locks itself to the grounded conductor 1322 in series with relay 1404. Accordingly, when interrupter 1402 opens, relay 1404 operates in series with relay 1403 and at its upper armature connects the interrupter 1401 to the stock-register operating conductor 1423. It will be noted that the same relation exists between cams 1401 and 1402 as exists between the cams 11 and 12, Fig. 8, of the transmitter, and that two impulses are transmitted by cam 1401 for each impulse transmitted by cam 1402. Also, cam 1401 always arrives in close position just as cam 1402 is changing from closed position to open position or from opened position to closed position. Accordingly, the operation of any relay under the control of cam 1402 takes place while cam 1401 is in opened position, and cam 1401 always sends out an impulse before another relay is operated by cam 1402.

With relay 1404 operated, each further operation of cam 1401 results in the sending of an impulse over conductor 1423 and through contacts of the relay 1417, and via the fractions operating conductor 1224 to the fractions register in the last group (LA) of stock group BBA, Fig. 15, through contacts of relays 1505 and 1510. Also, with relay A of the price-range register PR operated, connections exist from conductor 1423 through contacts of the operated relay A to the hundreds, tens, and units conductors 1221, 1222, and 1223 by way of contacts of relay 1417, resulting in the operation of the hundreds, tens, and units stock registers in group LA at the same time.

Following the operation of relay 1404, the next closure of interrupter 1402 results in the closing of a circuit through contacts of the operated relay 1404 and through contacts of the unoperated relays 1416, 1415, 1412, 1410, 1408, and 1406 for relay 1405. Relay 1405 operates and locks itself to conductor 1422 at its lower contacts through the winding of relay 1406 and by way of contacts controlled by the lower armature of relay 1415. As a result, relay 1406 energizes when interrupter 1402 opens, transferring the relay operating circuit to the next pair of counting relays.

The above operation continues, with a restoring impulse being delivered over the conductors 1221—1224 to the stock registers in group LA of stock BBA, Fig. 15, for each additional relay operated in the local sender. When relay 1412 operates, following the transmission of the eighth restoration impulse, it transfers the operating circuit through contacts of relay 1416 to relay 1415. Relay 1415 accordingly responds to the next closure of cam 1402, and at its upper armature closes a new operating circuit for itself independent of the contacts of relay 1412, at the same time disconnecting the relay-operating conductor from the armature of relay 1412. At its lower armature, relay 1415 closes a locking circuit for itself through relay 1416, at the same time opening the locking circuits of relays 1405—1412, permitting these relays to restore. When the interrupter 1402 next opens, relay 1416 operates in series with relay 1415 and again prepares locking circuits for relays 1405—1414 at its lower armature; prepares relays 1413 and 1414 to operate (at its inner-upper armature) following the next operation of relay 1412; and at its upper armature again connects the relay-operating conductor to the armature of relay 1412. By the time this happens, ten restoring impulses have been delivered over conductors 1221—1224 to the registers in the last price group of the group BBA, and the counting relays 1405—1412 have been restored, as above described, in readiness for operation to count the resetting impulses. In order to terminate the restoration impulses and to render the restoring impulses dependent upon the setting of the registers PH, PT, PU, and PF of Fig. 12, relay 1417 operates in parallel with relay 1416 and disconnects the restoring-impulse branches of conductors 1221—1224 from the said conductors.

The effect of the transmission of the restoration impulses will now be explained. It will be noted that each stock register comprises essentially an indicating drum such as 2202, Fig. 22, a driving magnet such as 2201 of the fractions register in the price-range group LA of stock BBA, Figs. 15 and 22, and a ratchet device operated by the magnet to advance the drum one-half step upon the operation of the magnet and the remaining one-half step upon the restoration of the magnet. A front piece 2203 is provided with a window through which the numerals on the drum are exposed one at a time. The drum 2203 also carries a cam 2204, which has a projection thereon arranged to engage the cam spring 2205 when the register is in blank position and shift the return circuit for the magnet 2201 from its local path to ground into connection with the branch 1511 of the actuating conductor 1420. Actuating conductor 1420 is not grounded during the transmission of the restoration impulses; and, as a result, each stock register in the range group LA, upon arriving in blank position, is unable to move further because its magnet circuit is shifted over to the ungrounded branch 1511 of actuating conductor 1420. Ten impulses are transmitted in the restoration group, because that is the maximum number of impulses required to advance a stock register to blank position. Accordingly, at the end of the tenth restoration impulse, all stock registers in the price-range group LA of stock BBA are standing in blank position.

*Resetting the stock registers*

The way in which the stock registers are reset to the respective positions indicated by the digits registered on the price registers PH, PT, PU, and PF of Fig. 12 will now be explained. It will be recalled that relays 1405—1412 have been restored responsive to the energization of relay 1415 and that relay 1416 was energized in series with relay 1415 at the end of the tenth restoring impulse. It will also be recalled that relay 1417 was energized in multiple with relay 1416. At its lower armature, relay 1417 places ground on the actuating-ground conductor 1420, extending a ground potential to the branch conductor 1511 local to the stock group BBA, Fig. 15. In the last price group LA, the return circuits for the operating magnet such as 2201 are all shifted over to the now-grounded branch of actuating conductor 1511, with the result that the next impulse delivered over conductors 1221—1224 results in an operation of all stock registers one step to the No. 1 position. With the price digits 1, 0, 4, and 1 set up on the registers PH, PT, PU, and PF of Fig. 12, the impulse delivered by cam 1401 is transmitted through the first of the ten digit conductors through contacts of relay 1405 and thence by way of contacts in the pyramids of the registers PH and PF to the hundreds and fractions conductors 1221 and 1224. The impulse is also transmitted through contacts of relay 1408 to the No. 4 digit conductor, and thence by way of contacts in the pyramid of the register PU to the units conductor 1223, and the impulse is transmitted through contacts of relay 1414 to the digit-0 conductor, and thence by way of contacts in the pyramid of the register PT to the tens conductor 1222.

At the end of the first restoration impulse, relay 1405 is again energized by cam 1402 through contacts of the operated relay 1416, and through contacts of the unoperated relays 1412, 1410, 1408, and 1406. Relay 1405 disconnects the No. 1 digit conductor, with the result that no further resetting impulses are transmitted over the hundreds and fractions conductors 1221 and 1224 to the hundreds and fractions registers in the last-price range group of the selected stock.

Following the second, third, and fourth impulses, respectively, of the resetting group, relays 1406, 1407, and 1408 are energized under the control of cam 1402, and relay 1408 disconnects the impulse conductor 1423 from the No. 4 digit conductor, terminating the transmission of impulses through the contact pyramid of the register PU and over the units conductors 1223 to the units register in the selected stock and stock range.

Following the termination of the fifth, sixth, seventh, eighth, ninth, and tenth impulses in the resetting group, relays 1409, 1410, 1411, 1412, 1413, and 1414, respectively, are energized; and the energization of relay 1414 terminates the transmission of resetting impulses through the contact pyramid of register PT and over the tens conductor 1222 to the tens register in the selected stock and stock-range group.

By the time relay 1414 operates, all of the resetting impulses have been transmitted, and the receiver may be finally cleared out.

Preliminary clear out of receiver

Prior to the final clearing-out of the receiver responsive to the completion of the operation of the local sender, a preliminary clearing-out operation takes place as soon as all of the digits of the code have been received. It will be recalled that the operation of the local sender is started responsive to the grounding of start conductor 1211 by the price-range register PR upon the receipt of the price-range digit. The impulses continue to come in as described until all of the price registers of Fig. 12 have been set; and, during the receipt of the impulses, one or more of the relays 1104—1107 is maintained operated, each being provided with a shunt winding to render them slow to release as hereinbefore described. When the impulses cease to come in, however, the relays 1104—1107 all fall back and open the circuit of relays 1101 and 1103. These latter relays both fall back, and remove ground potential from connecting conductor 1130, and also from locking conductor 1129. When this occurs, the stock registers SH, ST, SU, and SR all release. Transfer relay 1127 of the register SR removes ground potential at one point from locking conductor 1131, but this conductor is maintained grounded through contacts of the start and stop relays 1418 and 1419 pending the final clearing-out operation. Since the stock registers SH, ST, SU, and SR have been cleared out, impulses for the next quotation may be received and stored by the registers of Fig. 11 in the receiver REI, while the resetting impulses are being transmitted by the local sender of Fig. 14.

Final clearing out of the receiver

When relay 1414 operates at the end of the tenth resetting impulse, it closes a circuit for the lower winding of stop relay 1419. Relay 1419 operates and closes a locking circuit for itself at its inner-upper armature through contacts of the energized start relay 1418, and it also opens all locking circuits controlled by the start relay, whereupon the operated stock-range and stock-relays 1405 and 1410 release; all relays of the local sender release; and all of the registers of Fig. 12 release responsive to the removal of ground potential from locking conductor 1131. With the registers of Fig. 12 released, ground potential is removed from start conductor 1211, whereupon start relay 1418 falls back and opens the circuit of relay 1419. Relay 1419 falls back, and the receiver REI is finally cleared out.

Receiving short quotations

In some cases a new stock quotation differs from the previous one only in that the new quotation ends with a different fractions digit, in which case it is sufficient to reset the fractions stock register in the selected stock and stock-range group, leaving the hundreds, tens, and units stock registers standing in their previous positions. In other cases, the quotation may require a resetting of only the units and fractions stock registers, while in other cases a change is required in the tens, units, and fractions registers, but not in the hundreds register. As will be explained hereinafter, arrangements are made in the transmitter so that the operator may set up only the fractions price digit, only units and fractions, or only tens, units, and fractions, as may be necessary to change the previous setting to agree with the present quotation; while the transmitter is arranged to send out only the price digits set up. Also, the transmitter is arranged to automatically send out the price-range digit in accordance with the number of price digits about to be transmitted.

Assuming that the price-range digit is received over channel B, relay B of the price-range register PR, Fig. 12, operates and connects up conductor 1423 to the associated branches of the tens and units conductors 1222 and 1223, so that the restoration impulses will be sent to the tens and units registers in the selected stock and stock-range groups in addition to the fractions register. Relay B locks itself in series with transfer relay 1203 of the price-hundreds register PH, with the result that relay 1203 responds when the impulse to relay B of the register PR subsides, opening the circuit of connecting relay 1202 and closing a circuit for connecting relay 1206. In this way, the price-hundreds register PH is by-passed and the three price digits are received on the registers PT, PU, and PF so that the resetting impulses will be properly controlled in accordance with these registers.

In case the price-range digit is received over conductor C, only price-units and price-fractions digits are to be received, and relay C of register PR operates and connects up the restoring branch of the units conductor 1223 to conductor 1423 so that the restoring impulses will be delivered to the units and fractions registers only, and relay B of the price-range group locks itself in series with the transfer relay 1205 of the price-tens register PT. Relay 1205 disconnects connecting relay 1202, and closes a circuit for connecting relay 1208 so that the next two digits received are registered on the units and fractions registers PU and PF, respectively.

In case the price-range digit is received over conductor D, the D relay of the price-range register PR operates, and makes no connections regarding the restoration branches, so that the restoration impulses are automatically transmitted to the fractions register only of the selected stock and stock-range group. Relay D locks itself energized in series with transfer relay 1207 of the price-units register PU, with the result that relay 1207 operated and disconnects the connecting relay 1202 and closes a circuit for connecting relay 1210. The single price digit received is therefore received by the price-fractions register PF.

It will be understood, of course, that no resetting impulses are transmitted through a contact pyramid of a non-operated register, because the digit conductors 1—0 are all normally disconnected from the apexes of the respective pyramids.

Setting up short numbers

In the transmitter TI of Figs. 1 to 8, variations in the number of price digits in a quotation is automatically taken care of in a manner now to be explained. It was explained hereinbefore how the price-range digit transmitted through the price-range group PR of Fig. 7 is represented by an impulse over conductor A when four price digits are set up on the registers PH, PT, PU and PF, all four of the price-digit transfer conductors 703, 601, 603, and 605 being operated. In case only three price digits are set up, only the registers PH, PT, and PU are operated to store the tens, units, and fractions digits of the quotation, respectively. In this case, the price-range digit is transmitted from conductor 804 through contacts of the operated relays 703, 601, and 603, and through contacts of the unoperated transfer relay 605 to conductor B, sending the proper indication to cause the receivers to operate as hereinbefore described.

In case only price-units and price-fractions digits are set up, the price-units register is not operated, and the price-range digit is sent through the lower armature and back contact of relay 603 to the price-range conductor C.

In case only one price digit is set up, this digit is recorded on the register PH, and the price-range digit is transmitted through the lower armature and its back contact of relay 601 to the price-range conductor D.

*Sending the digit blank*

In case the digit blank, represented by the key B1, in the price-digit group of Fig. 4, is set up on any one of the price registers by the operation of relays A, B, and C therein, the corresponding digit is transmitted by means of an impulse over each of the channels A, B, and C, causing the A, B, and C relays in the corresponding price register of Fig. 12 to be operated. With relays A, B, and C operated, it will be noted that no connection exists between any one of the ten digit conductors 1 to 0 and the apex of the contact pyramid, with the result that no resetting impulses are transmitted. In this case, since the price-range digit causes the price range register PR of Fig. 12 to be set so as to restore the stock register in the selected stock and stock-range group corresponding to the transmitted digit blank, such register is not reset and therefore remains standing in blank position with no digit showing. This arrangement is particularly useful in case a quotation is to be changed from one hundred or more dollars to less than one hundred dollars, in which case the hundreds digit is transmitted as the digit blank. Also, the tens digit may be transmitted as the digit blank in case a preceding quotation of ten dollars or more is to be replaced by a quotation of less than ten dollars; and the units digits may be sent as the digit blank in case a quotation of more than one dollar is to be replaced by a quotation of only a fraction of a dollar.

*Setting up yesterday's closing price*

At the close of the day, the quotations set up on the stock registers at the indicating boards are wiped out, and the last price of the day for each stock is set up as yesterday's closing price so that it will show on the indicating boards when business is resumed the next day. Two methods of procedure may be followed. One method of procedure is for the operator to clear out all quotations in a stock group and then send through the last price of the day as yesterday's closing price, leaving that price alone showing on the stock register group of the several indicator boards. Another method of procedure is for the operator to send through the last price of the day as yesterday's closing price, and then wipe out the remaining registers. The operation of the system in accordance with the first method of procedure mentioned above will now be described.

In order to wipe out the quotations for stock BBA, the operator sets up the letters B, B, and A on her stock-letter keys of Fig. 1 with the results hereinbefore described, following which she depresses the stock-range key WO, Fig. 4, causing the wipe-out digit 9 to be set up on the stock-range register SR, Fig. 5. (assuming the register set #1 to be in use), wherein relay C is operated in accordance with the code table, Fig. 24. In this case, when transfer relay 501 of the stock-range register SR operates in series with the energized relay C, it starts the translation of the registered stock letters by grounding conductor 513 at its upper armature, with results described hereinbefore. Start relay 504 is operated as soon as the translation is effected, and the transmission of impulses takes place as hereinbefore described.

Since no price-digits are set up, transfer relay 703 of the price-hundreds register PH is not operated, and the price-range digit is represented by an impulse from conductor 804 through contacts of the nonoperated relay 703 over the price-range conductor A of the group PR. This takes place, of course, following the transmission of the three stock-code digits and the stock-range digit 9. The transmitter continues to operate, and the sending relays 35—38 are operated successively, but no price digits are sent out because none of the relays in the registers PH, PT, PU and PF are operated.

In the receiving apparatus of Figs. 11 to 15, the receiver RE1 is selected by the preliminary selecting impulse over conductor A as hereinbefore described, and the code digits 1, 2, and 2 are received on the registers SH, ST, and SU. Also, the digit 9, represented by an impulse on conductor C is received on the stock-range register SR. The stock relay 1510 is operated in the hereinbefore described manner responsive to the code digits 1, 2 and 2, and with the digit 9 set up on the register SR a circuit is closed over the associated No. 9 conductors extending from the base of the contact pyramid. Relay 1504 operates through its upper winding, and prepares a locking circuit for itself at its inner-lower armature.

The price-range digit in this case is received over conductor A, resulting in the operation of the relay A of the price-range register PR. Relay A prepares the hereinbefore described restoring circuit for restoring the hundreds, tens, and units registers in addition to the fractions register. Transfer relay 1201 of register PR operates in series with the associated relay A when the price-range impulse subsides, and at its upper armature it places ground on start conductor 1211, operating start relay 1418 to start the local sender, Fig. 14, in the hereinbefore described manner. Relay 1418 also closes a locking circuit at its upper armature for the energized stock-range relay 1504 and for the stock relay 1510. It will be noted that relay 1504, at its upper armature, closes a circuit for the yesterday's close range relay 1509 (YC), and at its inner-upper armature it closes a circuit for the unison relay (UN) 1503. Relay 1503 operates, and at its upper armature closes a circuit for the open-price relay (OP) 1508. Relay 1508 operates and locks itself energized and closes circuits for relays 1501 and 1502, and these relays also operate. Relays 1501 and 1502 close circuits for relays 1505, 1506 and 1507. As a result of the operation of relay 1504, all of the price-range relays 1501—1509 are operated, and stock-range relays 1505—1509 connect up all registers in the selected stock group BBA to the hundreds, tens, units, and fractions actuating conductors 1221, 1222, 1223 and 1224.

As a result of the setting of the price-range register, PR, wherein relay A is energized, the restoration impulses transmitted by the local sender of Fig. 14 go out over all four of the price-digit actuating conductors 1221—1224, and with relays 1505—1509 operated, these impulses are transmitted to the registers in all of the five stock ranges, YC, OP, HI, LO, and LA. As a result, all of the registers of stock BBA are restored to blank position.

When relay 1417 operates in parallel with the tenth counting relay (O') 1416 at the end of the tenth restoration impulse, it grounds the actuating-ground conductor 1420, as before described. In this case, relay 1504 is operated and a circuit is completed from conductor 1420 through the lower contacts of relay 1504 for stop relay 1418, operating relay 1419 to finally clear out the receiver immediately, as no resetting impulses are to be sent at this time.

In order to reset the registers in the range group YC of stock BBA, Fig. 15, in accordance with the last price of the business day just finished, the operator sets up the stock letters B, B, and A as before on the keys of Fig. 1, following which she sets up the price digits of the last price on the price-digit keys of Fig. 4, and operates the stock-range key YC, setting up the digit 8 in the stock-range register SR, Fig. 9, (assuming the No. 1 register to be in use). The transmitter now sends out the translated stock-code digits and the stock-range digit 8, followed by a price-range digit indicative of the number of price digits to follow, and finally the registered price digits themselves.

In the receiving apparatus of Figs. 11–15, the receiver RE1 is selected by the preliminary impulse over conductor A following which the code digits 1, 2, and 2, the stock-range digit 8, a price-range digit, and the registered price digits are received and stored.

The local sender of Fig. 14 is started to operate in the usual manner, and locking circuits are closed for the stock relay 1510 and for the yesterday's close range relay 1509 (YC), which relay is operated over the No. 8 conductor extending from the base of the contact pyramid of the stock-range register SR. The local sender first sends a group of restoration impulses but these impulses are unnecessary in the present case because all the stock registers in stock BBA are already standing in their blank position. Following this, actuating conductor 1420 is grounded and the resetting impulses are transmitted, resetting the registers in stock-range group YC of stock BBA in accordance with the last price digits set up on the price registers of Fig. 12.

In case the operator is following the second method of operation above mentioned, before clearing out the registers of a stock group, the operator sends through the last price of the day as yesterday's closing price by setting up the stock letters and the price digits in the usual manner, after which she depresses the key YC, Fig. 4, causing the stock-range digit 8 to be registered. The transmitter sends out the digits of the quotation, including the stock-range digit 8 which is registered on the stock-range register SR. In this case the yesterday's close relay 1509, Fig. 15, is operated, in addition to the stock relay 1510, resulting in the actuating conductors being connected up to the yesterday's close range group of stock BBA. The local sender first restores and then resets these registers in accordance with the setting of the price registers of Fig. 12.

Following this, the operator again sets up the same stock letters, followed by a depression of the stock-range key UN, causing the stock-range digit 7 to be set up.

When the stock-range digit 7 is received, the unison relay 1503 is operated under the control of the stock-range register SR, followed by the operation of relays 1501 and 1502, and relays 1501—1503 close circuits for stock-range relays 1505—1508. Accordingly, restoring circuits for stock-range groups OP, HI, LO, and LA (open, high, low, and last) are prepared, and restoring impulses are delivered over conductors 1221—1224 for the registers in these stock-range groups, setting all of them in blank position. No resetting impulses are transmitted owing to the fact that no price digits are set up in the registering apparatus of Fig. 12.

The second method of setting up yesterday's closing price and clearing out the remaining stock registers is usually preferable to the first method owing to the fact that the operator can take her quotations directly.

*First quotation of the day; open, high, low, last*

When the first quotation of the day comes through for any stock, this quotation is to be set up as the opening price, as the high price, as the low price, and as the last price. As a result, the operator sets up the stock letters and the price digits in the usual way, following which she operates the unison stock-range key UN, causing the price-range digit 7 to be set up and subsequently retransmitted.

In the receiver RE1, when the stock-range digit 7 is received, the unison relay 1503 (UN) is operated over the associated digit conductor 7, whereupon circuits are closed for relays 1501 and 1502, and circuits are closed through relays 1501—1503 for the open, high, low, and last range relays 1508, 1507, 1506, and 1505.

As a result, the price digits set up on the registering apparatus of Fig. 12 are transmitted by the hereinbefore described action of the local sender to the registers in stock-range group OP, HI, LO, and LA.

*Low-last quotation*

In case a quotation, other than the first quotation of the day, is the lowest quotation so far received for a particular stock, this quotation, in addition to being set up as the last price should be set up as the low price. In order to bring this about, the operator depresses the stock-range key LL of Fig. 4, setting up the stock-range digit 2. In the receiver RE1, the receipt of the digit 2 on the stock-range register SR results in the operation of the low-last range relay 1501 over the associated digit conductor 2. Relay 1501 closes circuits for the last and low range relays 1505 and 1506, with the result that the received price digits are properly set up on the selected stock as the low price and as the last price.

*High-last quotation*

Similarly, if the price about to be sent is the high price, in addition to being the last price, the operator depresses the range key HL of Fig. 4, causing the stock-range digit 3 to be set.

In the receiver RE1, when the digit 3 is set up on the stock-range register SR of Fig. 11, a circuit is closed over the associated digit 3 conductor for the high-last stock-range relay 1502, Fig. 15. Relay 1502 closes circuits for the last and high range relays 1505 and 1507, with the result that the received price digits are guided into the high and last range groups of the selected stock.

Direct-current transmission with line receiving relays

Referring now to the system represented by the drawings assembled as in Fig. 26, wherein Fig. 16 is substituted for Fig. 10 in the layout drawing of Fig. 25, the direct-current system of signal transmission disclosed in Fig. 16 will be explained. The signal conductors A, B, C, and D, incoming to Fig. 16 from Fig. 9, terminate in the line sending or repeating relays 1601, 1602, 1603, and 1604, one for each channel conductor. Each repeating relay is provided with as many armatures as there are lines, such as lines 1 and 2, and each line comprises four separate conductors. Each repeating relay repeats direct-current impulses received over the associated incoming signal conductor to the corresponding conductor of each line.

Considering line 1, this line serves a group of receiving stations, comprising ten stations, for example. At each station, the four line conductors are cut, and a line relay is inserted in each line conductor, the line conductors being connected to ground, as shown, at distant end of the line. At one intermediate station the line relays 1621—1624 are shown. At the receiving station at which the receivers RE1 and RE2, Figs. 11-15, are located, the line relays 1631—1634 are inserted in the line conductors, and these line relays repeat impulses over the conductors A to D to the receivers RE1 and RE2.

Each time a digit is received over the conductors A to D incoming to Fig. 16 from Fig. 9, one or more of the line sending relays 1601—1604 operates, and any sending relay, on operating, connects the associated source of potential to the corresponding conductor in each of the transmission lines. In each line, the corresponding relays, such as the relays 1621—1624, and the impulses are thereby repeating to the receiving conductors A to D such as the ones outgoing from Fig. 16 to Fig. 11. Keeping in mind that the transmitters T1 to T4 operate one at a time, and that transmitters T1 and T2 send out a preliminary impulse over the A conductor, while transmitters T3 and T4 send out a preliminary impulse over the B conductor, it will be understood that the relays 1101 and 1102 of Fig. 11 are selectively operated under the control of relays 1103—1107 to connect up either the receiver RE1 or receiver RE2 as the case may require, as described hereinbefore in connection with the layout shown in Fig. 25 and employing the line equipment of Fig. 10.

Direct-current transmission with vacuum-tube receivers

Referring now particularly to the layout as shown in Fig. 27, wherein Fig. 17 is substituted for Fig. 10 in the layout of Fig. 25 or for Fig. 16 in the layout of Fig. 26, the transmission arrangement employing the use of direct-current impulses and vacuum tube receivers will be explained. Each of the conductors A, B, C, and D incoming to Fig. 17 from Fig. 9 terminates in a separate one of the line sending, or repeating, relays 1701, 1702, 1703, and 1704. Each sending relay has a single pair of contacts by means of which the relay, upon operation, places a negative potential from the associated current source onto the corresponding one of the transmission conductors 1705—1708. As many outgoing four-conductor lines as are required are provided. Of these lines, line 1 comprises conductors 1717—1720. The lines are all connected in multiple to the sending transmission conductors 1705—1708. Line 1 is common to a number of receiving stations, the equipment associated with the line at the station having the receiving apparatus of Figs. 11 to 15 shown connected to line 1. The line connects in multiple to the corresponding apparatus of the other receiving stations operated thereover. The equipment at the receiving station includes four vacuum tubes, 1731—1734, having their filaments connected in parallel and lighted by the filament battery 1735. The four receiving relays 1738—1741 are connected in the plate circuits of the tubes 1731—1734, as shown, and the battery 1737 is provided for the purpose of energizing the receiving relays. The biasing battery 1736 is provided for the purpose of rendering the filaments of the vacuum tubes positive with respect to the grids thereof, preventing flow of too much current through the plate circuits of the vacuum tubes, but allowing enough to flow to maintain the relays 1738—1741 energized; the sending battery at the transmitting station being of negative polarity so as to decrease the current flow in the plate circuits of the vacuum tubes to bring about the restoration of the relays 1738—1741.

In order to guard the lines against inductive disturbances from foreign sources, the resistances 1709—1712 are connected to the transmission conductors 1705—1708, thus effectively grounding all of the transmission lines against disturbances by electro-static induction, or condenser effect. These resistances draw current from the sending current source during transmission, but the capacity of the sending battery is sufficiently great to supply this current flow without a noticeable lowering of the battery voltage.

In order to isolate the lines from one another in case one or more conductors of a line becomes grounded, line 1 is connected to the transmission conductor 1705—1708 through the resistances 1713—1716. These resistances prevent a grounded conductor from drawing an excessive amount of current, and in this way a ground potential on one line, although rendering all receivers on that line inoperative, does not affect the receivers on the other lines supplied with transmission signals over the common transmission conductors 1705—1708. It will be understood, of course, that resistances similar to resistances 1713—1716 are connected between each other line and the common conductor 1705—1708.

Since a vacuum tube ordinarily requires only a relatively small potential change on the grid element thereof to bring about a desired current change in the associated plate circuit, vacuum tubes have been heretofore considered unfit, for the most part, for direct connection to transmission lines using ground return circuits owing to the fact that differences in ground potential between a transmitting station and a receiving station may often amount to as much as the required signalling voltages, rendering the system inoperative. By the arrangement shown in Fig. 17, this objection is overcome. The potential of the transmitting battery associated with relays 1701—1704 may be made relatively high, 150 volts, for example, thereby making the transmitting potential high with respect to differences in ground potential likely to be encountered. At the receivers, the resistances such as the fixed resistance 1721 and the variable resistance 1722 are employed in order to cut down the transmitting potential to the potential required for satisfactory operation of the vacuum tubes, nine volts, for example. In this way, a difference of ground potential which may amount to from ten to thirty volts makes very little difference, if any, in the operation of the vacuum tubes, on account of the fact that this ground potential is expended equally on all portions of the entire resistance at a receiving vacuum tube, and is not made effective upon the grid circuit directly, as would be the case if each line conductor were connected directly to the grid of a vacuum tube, as for example, in the Bellamy application hereinbefore referred to.

*Simultaneous transmission; alternating current*

Figure 18:
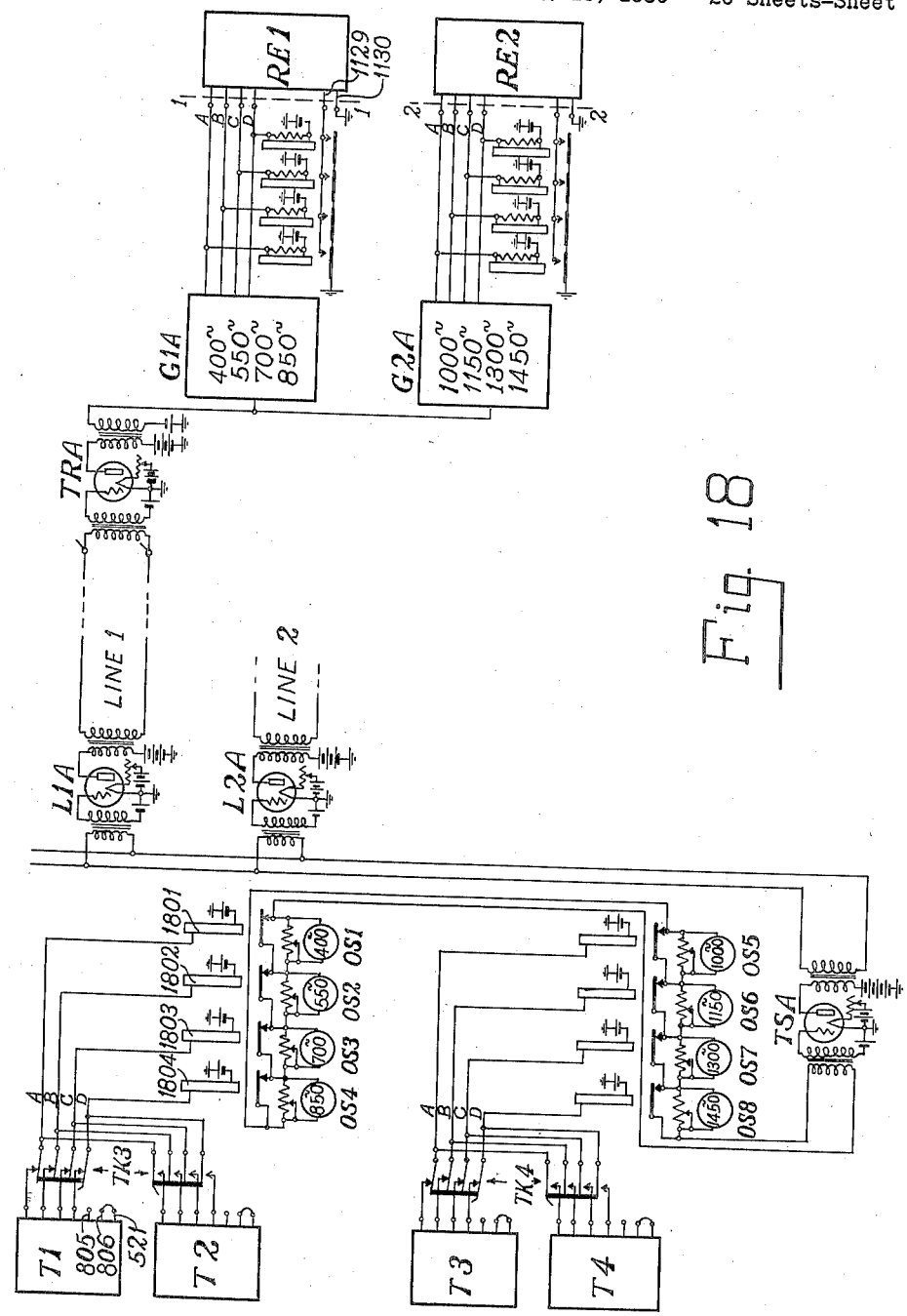
Fig. 18 shows how the system is organized when eight frequencies of alternating current are used to secure eight channels over a pair of conductors for the simultaneous transmission of two quotations.

It has been described hereinbefore how the transmitters operate one at a time to send impulses over the interconnecting transmission lines to the receivers, in combination with arrangements for transmitting one or the other of the two preliminary impulse signals to secure the connecting up of the correct one of the two receivers at a receiving pair. It may happen in some instances that the two operators have more quotations to send during a busy part of the day than can be sent with a safe sending speed over the transmission lines with the transmitters operating alternately. When this condition obtains, it becomes desirable to provide arrangements whereby the transmitters may operate simultaneously and without interference. Referring now to Fig. 18, one method of carrying out the simultaneous operation will be described. The same type of transmission equipment is employed in the system of Fig. 18 as is shown in Fig. 10. Four additional channels, however, are provided in Fig. 18. In this system the relay equipment of Fig. 9 is omitted, and the transfer keys TK1 and TK2 of Fig. 9 are replaced by the transfer keys TK3 and TK4, Fig. 18, and the strapping of the terminals of the transmitters T1, T2, T3, and T4 is changed, as shown. Specifically, the strap between conductor 805 of the transmitter T1 and the associated outgoing A conductor is removed, as no preliminary impulse is needed, and the outgoing start conductor 521 is connected directly to the incoming start conductor 806, as there is no need for the transmitter to wait its turn before starting to transmit. The other transmitters are similarly arranged.

In Fig. 18 separate line sending equipment is provided for the two pairs of transmitters. The line sending apparatus for transmitters T1 and T2 (whichever one is in use, depending upon the position of the transfer key TK3) includes the repeating relays 1801—1804. These repeating relays control the output circuits of the oscillators OS1, OS2, OS3, and OS4, as in Fig. 10 while four additional oscillators OS5—OS8 are connected with their outputs in series with one another and in series with the oscillators OS1—OS4, the oscillators OS5—OS8 being controlled by the line sending relays associated with the transmitters T3 and T4. The signals pass from the oscillators and line sending relays to the terminal sending amplifier TSA from which they pass the transmission lines such as line 1 and line 2. At the receivers RE1 and RE2, a terminal receiving amplifier TRA is connected to a branch of line 1. The group of amplifiers of Fig. 10, CAA, CBA, CCA, and CDA are represented in Fig. 18 by the rectangle labeled G1A, while the second group of channel amplifiers arranged to amplify and repeat the signals from the transmitters T3 and T4 are represented by the rectangle G2A. The group-1 amplifiers G1A control the receiver RE1; while the group-2 amplifiers G2A control the receiver RE2. The conductors A to D, leading from the group-1 amplifiers G1A to the receiver RE1, are provided with the slow-acting relays 1821—1824, which maintain the locking conductor 1129 grounded continuously while a quotation is being received by the amplifiers G1A. It will be noted that conductor 1130 of the receiver RE1 is permanently grounded in Fig. 18 so that the connecting relay 1122, Fig. 11 is normally energized when the receiver RE1 is used in the layout of Fig. 18. In this way, the stock-hundreds register SH, Fig. 11, of the receiver RE1 is normally ready for the first digit of a quotation. The same arrangement is employed in connection with receiver RE2.

It will be understood, of course, that the arrangement hereinbefore described in connection with the transmitters for spacing the quotations apart slightly so as to enable the preliminary clearing-out operation of the receivers to take place, is effective in the system of Fig. 18 to permit the relays such as 1821—1824 all to fall back between successive quotations, to permit the receiving apparatus of the receiver RE1 to clear out. The same arrangement in the transmitters T2 and T4 permits the proper clearing-out of the receivers such as RE2, Fig. 18, controlled thereby.

*Simultaneous transmission; polarized impulses*

Figure 19:
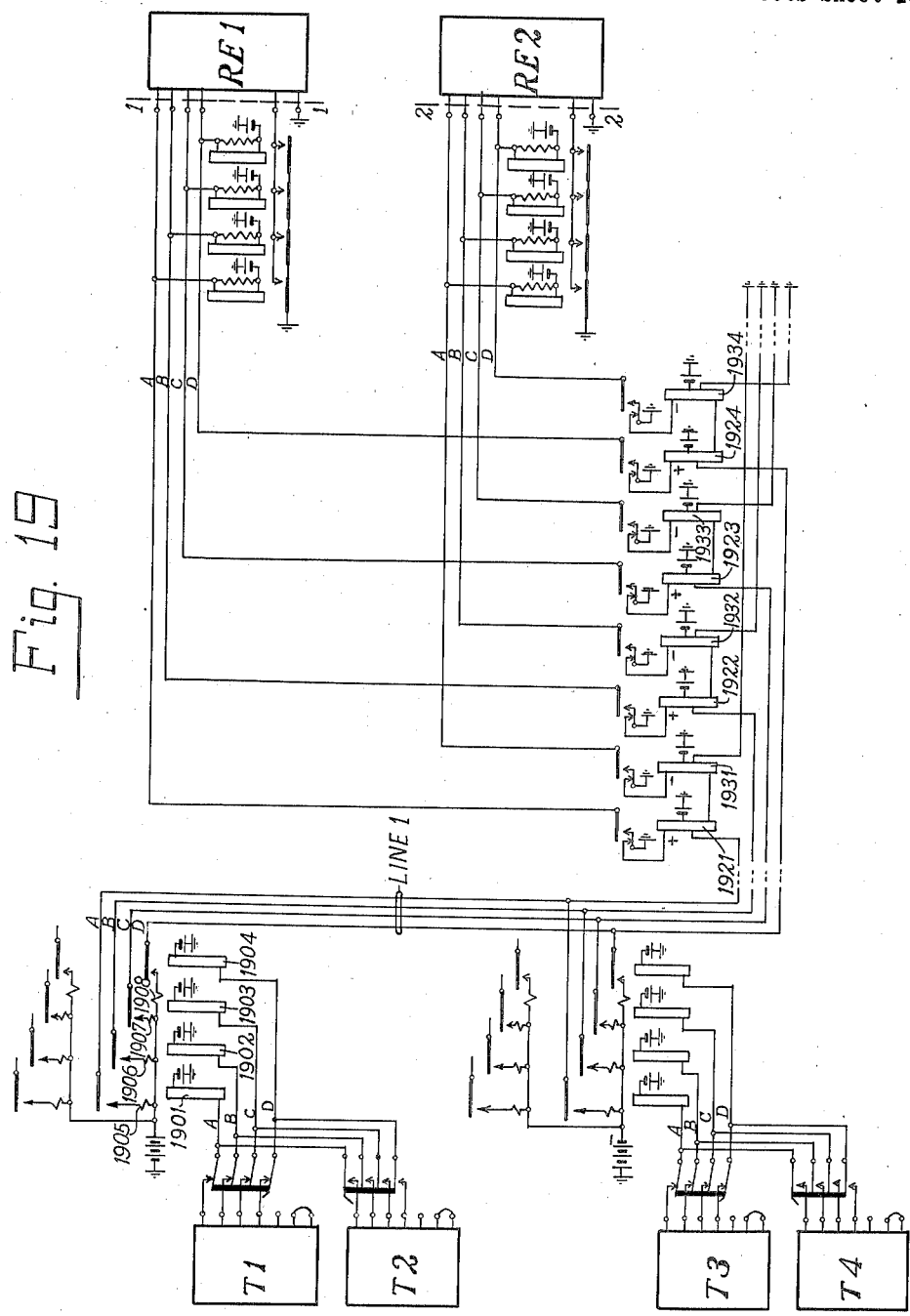
Fig. 19 shows how the system is organized when interspersed positive and negative impulses are used to obtain eight direct-current channels over four conductors for the simultaneous transmission of two codes.

Referring now to Fig. 19, which is a modification of the arrangement of Fig. 18, the method of operating two transmitters simultaneously by employing interspersed positive and negative impulses will be explained. As in Fig. 18, the system of Fig. 19 employs two groups of line sending relays, the relays 1901—1904 for the transmitters T1 and T2, and a similar repeater for transmitters T3 and T4. The line sending relays are arranged to send impulses to as many lines, such as line 1, as desired. The relays associated with transmitters T1 and T2 send positive impulses over the transmission lines, while the relays which are associated with the transmitters T3 and T4 send negative impulses over the transmission lines.

Following the transmission of an impulse, either positive or negative, over a transmission line, a space must be provided before another impulse of the same polarity can be transmitted over the same conductor of the line, in order to give time for the receiving relays operated by the first impulse to restore before the next impulse comes along. Accordingly, the sending cams of Fig. 21, which control the impulses sent by the transmitters T1 to T4, are arranged so that the impulses transmitted by either transmitter T1 or transmitter T2 are transmitted during the space between the impulses transmitted by either transmitter T3 or T4. This will be readily observed by inspecting Fig. 21, and noting that the sending cams 11 and 13, driven by the motor M1 and associated with transmitters T1 and T2, are passing through their closed positions while the corresponding impulsing cams 15 and 17 of transmitters T3 and T4 are passing through their open positions. It will be noted further that the relay-operating cams 12 and 14 associated with transmitters T1 and T2 are set to correspond with the settings of the impulsing cams 11 and 13, while the relay-operating cams 16 and 18 are differently set so as to have the correct relation to the cams 15 and 17 of the transmitters T3 and T4. It will be noted that the transfer key TK, having transfer springs 1 to 9, may be operated to stop the motor M1 and start the motor M2, and to transfer the operating conductors from the cams 11 to 18 of the motor M1 to the cams 21 to 28 of the motor M2.

Keeping in mind the arrangement of the cams, Fig. 21, whereby the impulses received by the relays 1901—1904 associated with transmitters T1 and T2, are interspersed between impulses received by the relays associated with the transmitters T3 and T4, it will be seen that the transmitters in use by the two operators may be sending simultaneously without interference. The resistances such as 1905—1908 are employed in order to prevent momentary, heavy circulating current in case a positive impulse should be placed on a line slightly before the preceding negative impulse has been removed or vice versa. This arrangement is desirable on account of the fact that there may occasionally be a slight overlapping when the system is arranged to operate at its highest efficiency. Each of the lines (such as line 1) in the system of Fig. 19 is arranged to supply signals to ten or more receiving stations, such as the one including the receivers RE1 and RE2. At each receiving station, eight polarized relays are connected in four pairs in the four line conductors, respectively, one relay of each pair being polarized so as to respond to the positive impulses, and the other relay of the pair being polarized to respond to the negative impulses. At the receiving station containing the receivers RE1 and RE2, the positively-polarized relays are 1921, 1922, 1923, and 1924, while the negatively-polarized relays are 1931, 1932, 1933, and 1934. The receiving relays are electro-polarized instead of being polarized in the usual way by a polarizing permanent magnet, the upper winding of each of the relays being the polarizing winding. The polarizing winding in each case has a relatively small number of turns of wire having a sufficiently high resistance a turn to keep the resulting magnetic condition of the relay at a point just below the operating requirement. In this way, when current flows through the line winding of one of the polarized relays in one direction, the line winding opposes the polarizing winding, and the relay does not operate, because the line winding is not sufficiently powerful to overcome the polarizing winding and magnetize the relay in the opposite direction sufficiently to operate it. On the other hand, when the current flows through the line winding of the relay in a direction such as to assist the polarizing winding, the two windings work together, quickly operating the relay.

In order to increase the speed at which the relays let go after having been energized, each relay has circuit arrangements controlled by its contact springs for opening its polarizing winding upon operating, so that the relay is held energized by the line winding only. For example, relay 1921, upon operating in response to a positive impulse over the A conductor of the line from line sending relay 1901, opens its polarizing winding at the same time that it sends an impulse over the associated A conductor to the receiver RE1. Relay 1921 is held operated by the line current through its lower winding without further assistance from the polarizing winding, and when the line current ceases, the relay falls back and again connects up its polarizing winding. By experiment, it was found that the arrangement of the electro-polarized relays of Fig. 19 is noticeably faster and more reliable than several standard polarized relays employing permanent magnets which were available for test.

It will be noted that the receivers RE1 and RE2 are connected up in Fig. 19 in the same way as in Fig. 18 hereinbefore described.

*Polarized-impulse transmission; vacuum-tube receivers*

Figure 20:
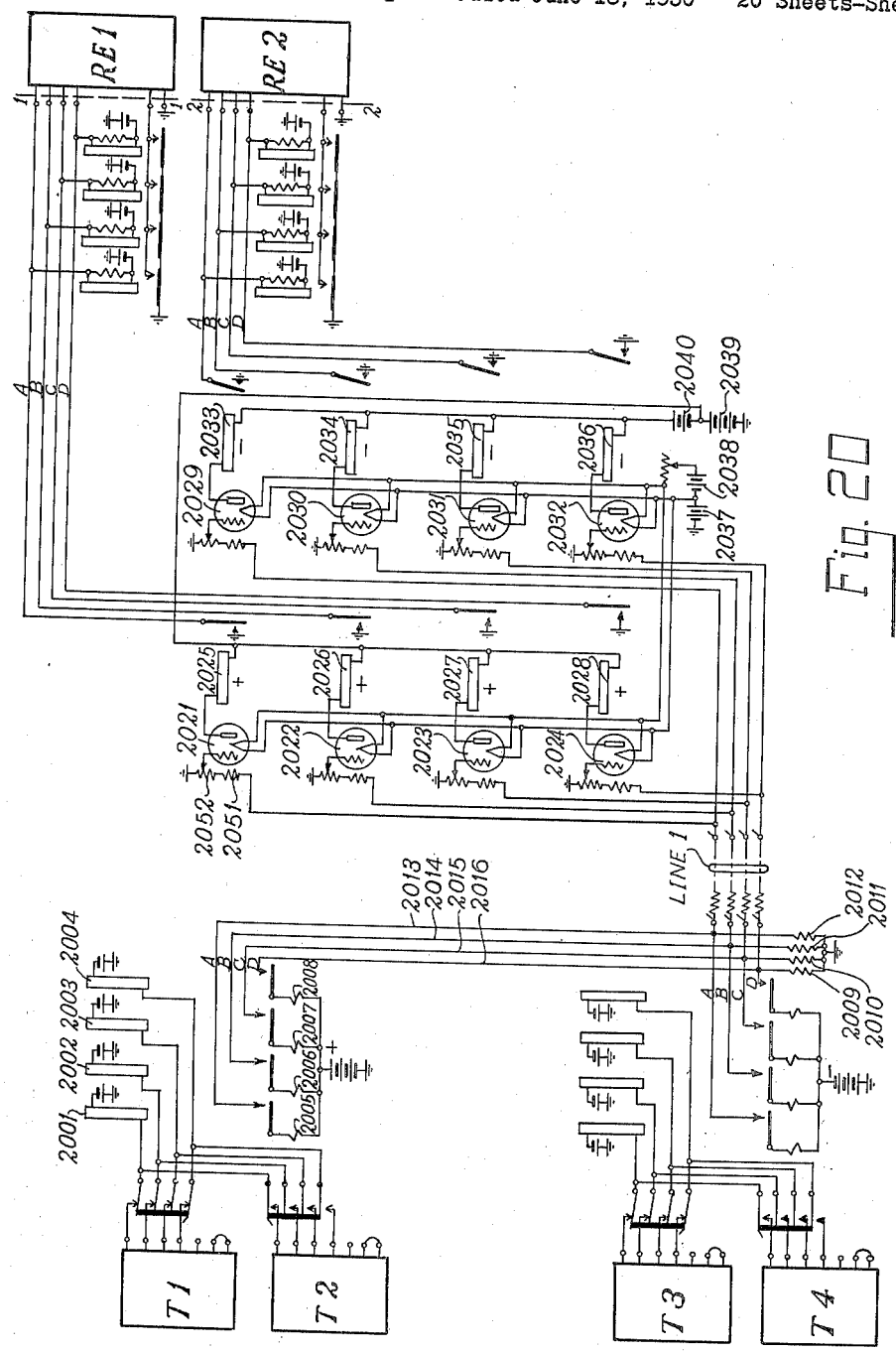
Fig. 20 is a modification of Fig. 19 wherein vacuum tubes are connected in the receiving lines in place of the line relays of Fig. 19.

Referring now to Fig. 20, the arrangement shown therein employing vacuum tubes for receiving the interspersed positive and negative impulses from the transmitters T1—T4 will be described. The line sending relays 2001—2004 are arranged to place positive impulses on the transmission conductors 2013—2016, while the line sending relays associated with transmitters T3 and T4 are arranged to place negative impulses on the transmission conductors 2013—2016. The resistances such as 2005—2002 are provided for the purpose of limiting the interchanging current between the positive and negative batteries in case there is an overlapping of signals.

As in the arrangement of Fig. 17, employing the transmission conductors 1705—1708, the transmission conductors 2013—2016 of Fig. 20 are normally grounded through resistances 2009—2012 to prevent foreign operating voltages from being induced by electro-static induction on the transmission lines, such as line 1. Each of the lines is connected to the transmission conductors 2013—2016 through the isolating resistances having a function such as described in connection with the resistances 1713—1716, Fig. 17. Each of the lines may be connected in parallel to a number of receiving stations. Line 1 is connected to the receiving station including receivers RE1 and RE2, as many branches as desired being extended to other receiving stations. In the receiving station shown in the drawings, four vacuum tubes 2021—2024 are arranged to receive the positive impulses from the transmitters T1 and T2, while four other vacuum tubes 2029—2032 are arranged to receive the negative impulses transmitted from the transmitter T3 and T4. The filaments of the tubes are connected up so as to be lighted by the filament battery 2038, and the filaments are suitably biased by the biasing battery 2037. Potential is supplied to the plates of the tubes 2021—2024 through the receiving relays 2025—2028 from the battery 2039. The relation of the voltages between the plate battery 2039 and the biasing battery 2037 is such that practically no current flows through the plate circuits of the tubes 2021—2024 with the line in normal condition, and the relays 2025—2028 are normally unoperated as shown. The additional plate battery 2040 boosts the voltage applied to the plates on the tubes 2029—2032 by way of the receiving relays 2035—2036 to such a value that the current-flow through the plates of the tubes 2029—2032 is sufficient to maintain the relays 2033—2036 normally operated as shown.

When a positive impulse is received over one or more of the conductors of line 1 from one or more of the line sending relays 2001—2004 associated with the transmitters T1 and T2, the grid potential of the corresponding ones of the tubes 2021—2024 and 2029—2032 is rendered positive, whereupon the current flow through these tubes increases. This does not affect the operated relays 2033—2036, but the one, or ones, of the relays 2025—2028 associated with the tube, or tubes, receiving the positive impulse operates to send an impulse, or impulses, to the receiver RE1 over one, or more, of the conductors A to D extending thereto from the contacts of the relays 2025—2028.

When the positive impulse subsides, the operated relay, or relays, of the group 2025—2028 falls back, and the apparatus is in the normal position shown in the drawings.

When a negative impulse is placed on one of the conductors of line 1, by one of the line sending relays associated with the transmitters T3 and T4, the corresponding one of the relays 2033—2036 is restored on account of the fact that the placing of a negative impulse on a conductor of line 1 causes current flow to cease in all the plate circuits of the vacuum tubes connected to the line. This does not affect the relays 2025—2028 because these relays are normally restored. When any one of the relays 2035—2036 is restored by a negative impulse on one of the line conductors, the relay, upon falling back, sends an impulse over the corresponding one of the conductors A to D leading from the contacts of these relays to the receiver RE2. When the negative impulse is terminated, the relay restored thereby reoperates.

As explained in connection with the arrangement shown in Fig. 17, high voltages are employed on the transmission conductors 2013—2016, and these voltages are cut down to the desired amount by means of the fixed and variable resistances such as 2051 and 2052. By moving the sliding arm of the variable resistance 2052, any desired portion (within fixed limits) of the voltage impressed on the A conductor of line 1 may be impressed on the grid of vacuum tube 2021. This enables an individual adjustment to be made for each tube, and this is of considerable importance when the tubes being used vary somewhat in their characteristics. However, in case the characteristics of the tubes are sufficiently uniform, only one fixed resistance such as 2051 and one variable resistance such as 2052 may be used for each line conductor at a receiving station, and the grid circuits of both tubes associated with such line conductor may be connected to the slide arm of the single variable resistance for that conductor. For example, the branch of conductor A of line 1 leading to ground through the fixed and the variable resistances associated with tube 2029 may be removed, and the grid of tube 2029 may be attached to the grid element of the tube 2021, the resistances 2051 and 2052 in this case being common to the tubes 2021 and 2029.

*Transmitting stock quotations to distant cities*

It may become desirable to install a group of receiving stations in one city, operated from a transmitter in another city, which transmitter also operates a group of receiving stations in the said other city. For example, if the transmitters and receivers illustrated in the accompanying drawings are installed in New York city, it may be desirable to install receivers in other cities, Boston, Philadelphia, and Chicago, for example, all operated from the transmitting station in New York city. The way in which this may be done will now be explained.

Referring now to Fig. 10, it will be noted that the line 1 and line 2 amplifiers L1A and L2A have their input circuits connected in multiple and supplied with signals from the terminal sending amplifier TSA. It was explained hereinbefore that as many lines as desired may be supplied with signals from the terminal sending amplifier TSA by merely supplying other line amplifiers similar to the amplifiers L1A and L2A. In this way, an additional line provided with a line amplifier such as LXA may be extended from New York to Boston by way of a regular telephone line or any other pair of wires similarly constructed; another line may be extended to Philadelphia; while still another line may be extended to Chicago. It will probably be necessary to install amplifiers at intervals along the inter-city lines, which amplifiers may be similar to the line amplifiers L1A and L2A. If desired, however, regular inter-city telephone lines may be employed, in which case the regular telephone repeaters employed in these telephone lines will suffice for amplifying the alternating-current stock-quotation signals, since these signals have frequencies lying within the voice range of frequencies, which regular telephone repeaters are designed to repeat and amplify.

At each of the distant cities, the line incoming from the transmitting station may terminate at an amplifier similar to the terminal sending amplifier TSA of Fig. 10, followed by as many line amplifiers such as L1A and L2A as may be necessary for he local distribution in that city. If desired, one of the local distribution lines in a city distant from the transmitters may be used as a transmission line to carry signals to a still more distant city.

If desired, a group of amplifiers such as the group G1A of Fig. 10 may be connected to the output of the receiving amplifiers in the distant city, and the relays of the group amplifier may be connected up to send direct current impulses over four conductors in accordance with the arrangement of Fig. 17, or the relays of the group amplifier may operate a group of line sending relays corresponding to the relays 1601—1604 of Fig. 16.

In case the simultaneous system of transmission is employed, as indicated in Figs. 18, 19, and 20, the terminal apparatus in the distant city to which stock-quotation signals are transmitted may be modified to correspond to the distributing arrangement of either Fig. 18, Fig. 19, or Fig. 20.

It will be understood, of course, that a four-conductor line, such as the one in Fig. 17 or the one in Fig. 20, may be used for inter-city transmission if desired, in which case four so-called Morse legs of composited telephone lines may be obtained and operated more economically than four special wires, on account of the fact that the telephone lines may still be used for telephone purposes as is well known.

What is claimed is:

1. In a stock-quotation receiver, a price-range register and a group of price-digit registers, means for transmitting a price range digit and for transmitting successively a variable number of price digits to said receiver, and circuit arrangements controlled in accordance with the setting of the price-range register for causing the first price digit to be received to be registered on a given price-digit register or on a different one, depending upon the setting of the price-range register.

2. In a receiver adapted to receive successive digit signals, registers for receiving and storing respective digit signals, transfer apparatus and means for operating it while digit signals are being received to render the registers effective successively to receive and store the successive digit signals, and means for causing said transfer apparatus to skip a number of the registers depending upon the value of the digit received and stored on a preceding register.

3. In a receiver adapted to receive successive digit signals, registers for receiving and storing respective digit signals, transfer apparatus and means for operating it while digit signals are being received to render the registers effective successively to receive and store the successive digit signals, and means for causing said transfer apparatus to skip one of said registers or not depending upon the digit value of the signal received at and stored on a preceding register.

4. In a stock quotation system, a distributor, a plurality of groups of storage relays, means for invariably connecting said distributor to one of said storage relay groups, means for selectively operating the relays in said group in accordance with the impulses received by said distributor, and means for predetermining, in accordance with the energization of the relays in said invariably connected group, which of the remaining storage relay groups are to be connected to said distributor.

5. In a stock quotation system, a distributor, a plurality of storage relay groups, means for invariably connecting said distributor to one of said groups, means for selectively operating the relays in said invariably connected group in accordance with impulses received by said distributor, switching apparatus, means for variably positioning said switching apparatus in accordance with the energization of the relays in said invariably connected group, and means responsive to the positioning of said switching apparatus for predetermining which of the remaining groups are to be connected to said distributor.

6. In a stock quotation system, a stock quotation receiver, price-digit registers each arranged to register a price-digit of a different numerical order than the other price-digit registers, transmitting means arranged to transmit successively a variable number of price digits to said quotation receiver over a common channel, additional registering apparatus in said receiver, means controlled from the transmitter for setting said additional registering apparatus prior to the transmission of the price digits and into a position indicative of the number of price digits to be transmitted, and circuit arrangements controlled by said additional registering apparatus for preparing the receiving circuits in the receiver depending upon the number of price digits to be received so that the received price digits will be directed to the respective price-digit registers of the corresponding numerical order.

7. In a stock-quotation receiver, a group of stock registers arranged to register and display price digits of a stock quotation, a stock-quotation transmitter arranged to transmit a variable number of price digits and to transmit a price-range digit of a value depending upon the instant number of price digits, registering and resending apparatus in the receiver arranged to register and resend the price digits to the indicating stock registers, and means controlled in accordance with the transmitted price-range digit for altering the registering and resending apparatus in accordance with the value of the transmitted price-range digit so that the transmitted price digits are displayed on the stock registers of the corresponding numerical order.

8. In a receiver adapted to receive successively a varying number of digit signals, registers for receiving and storing the received digit signals, transfer apparatus and means for operating it while a group of digit signals is being received to render the registers successively effective to receive and store the successive digit signals, and means effective dependent upon the digit value of the signal received at and stored on an intermediate one of said registers for causing said transfer apparatus to skip one of the following registers and to associate the register next succeeding the skipped register when the group contains less than the normal number of digit signals.

9. In a stock quotation receiver, a plurality of groups of storage relays, a set of conductors over which digit signals are received in code, means for connecting said set of conductors to said groups of relays separately, said means comprising a series of connecting relays, one for each group, means for invariably energizing the connecting relay associated with a particular one of said groups to enable said group to receive and store a variable signal indicative of the number of succeeding signals, means effective while the succeeding signals are being received for successively energizing the remaining connecting relays, and means for preventing the energization of a variable number of the remaining connecting relays, depending on the signal received at said particular group, whenever the number of succeeding signals is less than the number of remaining relay groups.

HAROLD C. ROBINSON.
MARTIN L. NELSON.